United States Patent
Katsuda et al.

(10) Patent No.: US 9,758,629 B2
(45) Date of Patent: Sep. 12, 2017

(54) COMPOSITION FOR PRODUCING PROTECTIVE FILM, PROTECTIVE FILM, AND ELECTRICAL STORAGE DEVICE

(71) Applicant: JSR CORPORATION, Minato-ku (JP)

(72) Inventors: Kouhei Katsuda, Minato-ku (JP); Yoshiharu Otsuka, Minato-ku (JP); Kazuaki Itou, Minato-ku (JP); Ichiro Kajiwara, Minato-ku (JP); Hiroyuki Miyauchi, Minato-ku (JP)

(73) Assignee: JSR CORPORATION, Minato-ku (JP)

( * ) Notice: Subject to any disclaimer, the term of this patent is extended or adjusted under 35 U.S.C. 154(b) by 152 days.

(21) Appl. No.: 14/427,233

(22) PCT Filed: Aug. 22, 2013

(86) PCT No.: PCT/JP2013/072398
§ 371 (c)(1),
(2) Date: Mar. 10, 2015

(87) PCT Pub. No.: WO2014/041983
PCT Pub. Date: Mar. 20, 2014

(65) Prior Publication Data
US 2015/0240039 A1 Aug. 27, 2015

(30) Foreign Application Priority Data

Sep. 11, 2012 (JP) .................................. 2012-199781
Mar. 22, 2013 (JP) .................................. 2013-059635

(51) Int. Cl.
| | | |
|---|---|---|
| C08J 5/18 | (2006.01) | |
| H01G 11/52 | (2013.01) | |
| H01G 11/28 | (2013.01) | |
| H01M 2/16 | (2006.01) | |
| H01G 11/22 | (2013.01) | |
| H01G 11/06 | (2013.01) | |
| H01G 11/58 | (2013.01) | |
| H01M 4/62 | (2006.01) | |
| H01M 10/0525 | (2010.01) | |
| H01M 10/058 | (2010.01) | |

(52) U.S. Cl.
CPC ............... *C08J 5/18* (2013.01); *H01G 11/06* (2013.01); *H01G 11/22* (2013.01); *H01G 11/28* (2013.01); *H01G 11/52* (2013.01); *H01G 11/58* (2013.01); *H01M 2/1653* (2013.01); *H01M 2/1686* (2013.01); *H01M 4/628* (2013.01); *H01M 10/058* (2013.01); *H01M 10/0525* (2013.01); *C08J 2347/00* (2013.01); *H01M 2220/20* (2013.01); *H01M 2220/30* (2013.01); *Y02E 60/13* (2013.01); *Y02T 10/7011* (2013.01); *Y02T 10/7022* (2013.01)

(58) Field of Classification Search
CPC ..................... C08J 5/18; C08J 2347/00
See application file for complete search history.

(56) References Cited

U.S. PATENT DOCUMENTS

| | | |
|---|---|---|
| 8,512,898 B2 | 8/2013 | Baba et al. |
| 8,663,839 B2 | 3/2014 | Maegawa et al. |
| 8,709,652 B2 | 4/2014 | Maegawa et al. |
| 2009/0061313 A1 | 3/2009 | Tadano |
| 2010/0255380 A1 | 10/2010 | Baba et al. |
| 2011/0318630 A1 | 12/2011 | Wakizaka et al. |
| 2012/0189897 A1 | 7/2012 | Wakizaka et al. |
| 2012/0189898 A1 | 7/2012 | Wakizaka et al. |
| 2013/0052530 A1 | 2/2013 | Kitaguchi et al. |
| 2013/0266873 A1 | 10/2013 | Ishii et al. |
| 2013/0280584 A1 | 10/2013 | Matsumura |
| 2013/0323588 A1 | 12/2013 | Kajiwara et al. |
| 2014/0038041 A1 | 2/2014 | Kajiwara et al. |
| 2014/0217322 A1 | 8/2014 | Yamada et al. |
| 2014/0272523 A1 | 9/2014 | Otsuka et al. |

FOREIGN PATENT DOCUMENTS

| | | |
|---|---|---|
| CN | 102630353 A | 8/2012 |
| CN | 102640329 A | 8/2012 |
| JP | 62 127336 | 6/1987 |
| JP | 4 98201 | 3/1992 |
| JP | 2002 30113 | 1/2002 |
| JP | 2009 54455 | 3/2009 |
| JP | 2009 87562 | 4/2009 |
| JP | 2009 120784 | 6/2009 |
| JP | 2011-165430 A | 8/2011 |
| JP | 5077613 B1 | 11/2012 |
| JP | 2013-037883 | 2/2013 |
| JP | 2013-084502 A | 5/2013 |
| JP | 2013-098123 | 5/2013 |
| WO | 2009 041395 | 4/2009 |
| WO | 2010 074202 | 7/2010 |

(Continued)

OTHER PUBLICATIONS

International Search Report issued Nov. 5, 2013 in PCT/JP2013/072398.
Combined Chinese Office Action and Search Report issued on Jun. 2, 2016 in Patent Application No. 201380028617.8 (with English translation).
U.S. Appl. No. 14/408,803, filed Dec. 17, 2014, Miyauchi et al.
International Search Report Issued Nov. 5, 2013 in PCT/JP2013/072398 Filed Aug. 22, 2013.
U.S. Appl. No. 14/679,431, filed Apr. 6, 2015, Kitaguchi, et al.

*Primary Examiner* — Robert Jones, Jr.
(74) *Attorney, Agent, or Firm* — Oblon, McClelland, Maier & Neustadt, L.L.P.

(57) ABSTRACT

A composition for forming a protective film that is placed between a positive electrode and a negative electrode of an electrical storage device, includes polymer particles (A1), polymer particles (A2), and a liquid medium, the polymer particles (A1) including a repeating unit derived from a compound that includes two or more polymerizable unsaturated groups in an amount of less than 15 parts by mass based on 100 parts by mass of the polymer particles (A1), and the polymer particles (A2) including a repeating unit derived from a compound that includes two or more polymerizable unsaturated groups in an amount of 20 to 100 parts by mass based on 100 parts by mass of the polymer particles (A2).

16 Claims, 3 Drawing Sheets

(56) References Cited

FOREIGN PATENT DOCUMENTS

| | | | |
|---|---|---|---|
| WO | WO 2011040562 A1 * | 4/2011 | ............ H01M 2/145 |
| WO | WO 2012/029805 A1 | 3/2012 | |
| WO | WO 2012/043812 A1 | 4/2012 | |
| WO | WO 2012/057324 A1 | 5/2012 | |
| WO | WO 2012/073996 A1 | 6/2012 | |

* cited by examiner

COMPOSITION FOR PRODUCING PROTECTIVE FILM, PROTECTIVE FILM, AND ELECTRICAL STORAGE DEVICE

CROSS REFERENCE TO RELATED APPLICATIONS

The present application is a 35 U.S.C. §371 national stage patent application of International patent application PCT/JP2013/072398, filed on Aug. 22, 2013 published as WO/2014/041983 on Mar. 20, 2014, the text of which is incorporated by reference, and claims the benefit of the filing date of Japanese application nos. 2012-199781, filed on Sep. 11, 2012, and 2013-059635, filed on Mar. 22, 2013, the text of which is also incorporated by reference.

TECHNICAL FIELD

The present invention relates to a composition for forming a protective film that can be used for an electrical storage device, a protective film, and an electrical storage device that includes the protective film.

BACKGROUND ART

In recent years, a high-voltage electrical storage device having high energy density has been desired as a power supply (drive power supply) for driving an electronic device. In particular, a lithium-ion battery and a lithium-ion capacitor have been expected to be a high-voltage electrical storage device having high energy density.

A further reduction in size has been desired for such a high-voltage electrical storage device having high energy density. In order to reduce the size of the electrical storage device, it is necessary to reduce the thickness of the separator that isolates the positive electrode and the negative electrode, in addition to the thickness of the positive electrode, the negative electrode, and the like, for example. However, a short circuit may easily occur when the gap between the positive electrode and the negative electrode decreases along with a reduction in size of the electrical storage device.

In particular, when the electrical storage device utilizes metal ions such as lithium ions, dendrites tend to be produced on the surface of the electrode due to the metal ions during repeated charge and discharge. Such dendrites normally precipitate in the form of a needle-like crystal, and are easily grown through the separator (i.e., porous membrane). If dendrites have been grown through the separator, and have reached the surface of the other electrode, the electrical storage device is short-circuited, and the charge-discharge function is lost. It is likely that such a phenomenon occurs, and reliability deteriorates along with a reduction in thickness of the separator and a reduction in the gap between the positive electrode and the negative electrode.

For example, WO2009/041395 and JP-A-2009-87562 disclose a technique that improves the battery characteristics by forming a porous layer that includes a resin binder including a polyamide, polyimide, or polyamideimide on the porous separator substrate in order to prevent the above phenomenon. JP-A-2009-54455 discloses a technique that improves the battery characteristics by forming a porous protective film that includes a binder including a fluorine-based resin and a rubber-based resin on at least one of the surface of the positive electrode and the surface of the negative electrode. WO2010/074202 discloses a technique that improves the battery characteristics by forming a porous layer that includes a copolymer including a (meth)acrylonitrile monomer unit and a (meth)acrylate monomer unit on the porous separator substrate.

SUMMARY OF INVENTION

Technical Problem

According to the above patent documents, a short circuit due to dendrites produced during charge and discharge can be suppressed by forming the protective film on the surface of the separator or the electrode. However, since the electrolyte solution permeability-retention capability of the protective film deteriorates, adsorption and desorption of lithium ions with respect to the active material are hindered. As a result, the internal resistance of the electrical storage device increases, and the charge-discharge characteristics deteriorate.

Since a protective film that is formed on the surface of the separator or the surface of the electrode using the materials disclosed in the above patent documents exhibits low adhesion to the electrode, the gap between the electrodes may become non-uniform. As a result, the electrode reaction due to charge and discharge non-uniformly proceeds on the surface of the electrode, and the charge-discharge characteristics deteriorate.

Specifically, a protective film-forming material that exhibits an excellent electrolyte solution permeability-retention capability, and can suppress an increase in internal resistance of the electrical storage device has not been known. In particular, when applying a binder that includes an organic polymer to a protective film that is situated opposite to the positive electrode, it is necessary to ensure high oxidation resistance that prevents oxidation due to the positive electrode reaction.

Several aspects of the invention may solve the above problems, and provide a protective film that exhibits an excellent electrolyte solution permeability-retention capability, and can suppress an increase in internal resistance of an electrical storage device, a composition for forming the protective film, and an electrical storage device that includes the protective film.

Solution to Problem

The invention was conceived in order to solve at least some of the above problems, and may be implemented as described below (see the following aspects and application examples).

Application Example 1

According to one aspect of the invention, there is provided a composition for forming a protective film that is placed between a positive electrode and a negative electrode of an electrical storage device, the composition including:

polymer particles (A1), polymer particles (A2), and a liquid medium, the polymer particles (A1) including a repeating unit derived from a compound that includes two or more polymerizable unsaturated groups in an amount of less than 15 parts by mass based on 100 parts by mass of the polymer particles (A1), and the polymer particles (A2) including a repeating unit derived from a compound that includes two or more polymerizable unsaturated groups in an amount of 20 to 100 parts by mass based on 100 parts by mass of the polymer particles (A2).

Application Example 2

In the composition according to Application Example 1, the compound that includes two or more polymerizable unsaturated groups may be at least one compound selected from the group consisting of a polyfunctional (meth)acrylate and an aromatic polyfunctional vinyl compound.

Application Example 3

In the composition according to Application Example 1 or 2, the polymer particles (A2) may further include a repeating unit derived from an unsaturated carboxylic ester (excluding a compound that falls under the compound that includes two or more polymerizable unsaturated groups), and a repeating unit derived from an aromatic vinyl compound (excluding a compound that falls under the compound that includes two or more polymerizable unsaturated groups).

Application Example 4

In the composition according to any one of Application Examples 1 to 3, the polymer particles (A2) may be particles having a void.

Application Example 5

According to another aspect of the invention, there is provided a composition for forming a protective film that is placed between a positive electrode and a negative electrode of an electrical storage device, the composition including:
polymer particles (A1), polymer particles (A2), and a liquid medium,
the polymer particles (A1) being solid particles, and the polymer particles (A2) being particles having a void.

Application Example 6

In the composition according to Application Example 5, the polymer particles (A2) may include a repeating unit derived from a compound that includes two or more polymerizable unsaturated groups, a repeating unit derived from an unsaturated carboxylic ester (excluding a compound that falls under the compound that includes two or more polymerizable unsaturated groups), and a repeating unit derived from an aromatic vinyl compound (excluding a compound that falls under the compound that includes two or more polymerizable unsaturated groups).

Application Example 7

In the composition according to any one of Application Examples 1 to 6, the polymer particles (A1) may include a repeating unit derived from a fluorine atom-containing monomer, and a repeating unit derived from an unsaturated carboxylic acid.

Application Example 8

In the composition according to any one of Application Examples 1 to 6, the polymer particles (A1) may be polymer alloy particles that include a polymer that includes a repeating unit derived from at least one compound selected from the group consisting of vinylidene fluoride, tetrafluoroethylene, and hexafluoropropylene, and a polymer that includes a repeating unit derived from an unsaturated carboxylic acid.

Application Example 9

In the composition according to Application Example 8, the polymer alloy particles may have only one endothermic peak within a temperature range of −50 to +250° C. when subjected to differential scanning calorimetry (DSC) in accordance with JIS K 7121.

Application Example 10

In the composition according to Application Example 9, the polymer alloy particles may have the only one endothermic peak within a temperature range of −30 to +80° C.

Application Example 11

In the composition according to any one of Application Examples 1 to 6, the polymer particles (A1) may include a repeating unit derived from an unsaturated carboxylic acid, a repeating unit derived from an unsaturated carboxylic ester, a repeating unit derived from an aromatic vinyl compound, and a repeating unit derived from a conjugated diene compound.

Application Example 12

In the composition according to Application Example 11, the polymer particles (A1) may have only one endothermic peak within a temperature range of −50 to +80° C. when subjected to differential scanning calorimetry (DSC) in accordance with JIS K 7121.

Application Example 13

The composition according to any one of Application Examples 1 to 12 may include the polymer particles (A1) in an amount of 0.1 to 15 parts by mass based on 100 parts by mass of the polymer particles (A2).

Application Example 14

In the composition according to any one of Application Examples 1 to 13, the polymer particles (A1) may have a number average particle size (Da1) of 20 to 450 nm.

Application Example 15

In the composition according to any one of Application Examples 1 to 14, the polymer particles (A2) may have a number average particle size (Da2) of 100 to 3000 nm.

Application Example 16

In the composition according to any one of Application Examples 1 to 15, the ratio (Da2/Da1) of the number average particle size (Da2) of the polymer particles (A2) to the number average particle size (Da1) of the polymer particles (A1) may be 1 to 30.

Application Example 17

In the composition according to any one of Application Examples 1 to 16, the polymer particles (A2) may have a toluene insoluble content of 90% or more, and have a 10% weight loss temperature of 320° C. or more when heated at a rate of 20° C./min during thermogravimetry in an air atmosphere.

Application Example 18

According to another aspect of the invention, there is provided a composition for forming a protective film that is placed between a positive electrode and a negative electrode of an electrical storage device, the composition including:

polymer particles (A) and a liquid medium, the polymer particles (A) having only one endothermic peak within a temperature range of −50 to +80° C. when subjected to differential scanning calorimetry (DSC) in accordance with JIS K 7121, and decreasing in weight by 10 wt % in an air atmosphere at a temperature of 320° C. or more when subjected to thermogravimetry in accordance with JIS K 7120.

Application Example 19

According to another aspect of the invention, there is provided a composition for forming a protective film that is placed between a positive electrode and a negative electrode of an electrical storage device, the composition including:

polymer particles (A) and a liquid medium, the polymer particles (A) having a toluene insoluble content measured at 50° C. of 90% or more.

Application Example 20

According to another aspect of the invention, there is provided a protective film that is formed using the composition according to any one of Application Examples 1 to 19.

Application Example 21

According to a further aspect of the invention, there is provided an electrical storage device including a positive electrode, a negative electrode, the protective film according to Application Example 20 that is placed between the positive electrode and the negative electrode, and an electrolyte solution.

Application Example 22

In the electrical storage device according to Application Example 21, the protective film may come in contact with at least one of the surface of the positive electrode and the surface of the negative electrode.

Application Example 23

The electrical storage device according to Application Example 21 or 22 may further include a separator that is placed between the positive electrode and the negative electrode.

Application Example 24

In the electrical storage device according to Application Example 23, the surface of the separator may be covered with the protective film.

Application Example 25

In the electrical storage device according to Application Example 23, the protective film may be contiguously held between the positive electrode or the negative electrode, and the separator.

Advantageous Effects of Invention

An electrical storage device that includes a protective film formed using the composition (composition for forming a protective film that is placed between a positive electrode and a negative electrode of an electrical storage device) (hereinafter may be referred to as "protective film-forming composition") according to the aspects of the invention exhibits an excellent electrolyte solution permeability-retention capability, and can suppress an increase in internal resistance. Specifically, since the internal resistance of the electrical storage device increases to only a small extent even when subjected to repeated charge and discharge, or overcharge, the electrical storage device exhibits excellent charge-discharge characteristics. Since the protective film is placed between the positive electrode and the negative electrode, it is also possible to suppress occurrence of a short circuit that may occur due to dendrites produced during charge and discharge.

Since the protective film-forming composition according to the aspects of the invention exhibits excellent oxidation resistance, the protective film-forming composition may suitably be used to form a protective film that is situated opposite to the positive electrode of the electrical storage device.

DESCRIPTION OF EMBODIMENTS

Figure 1:
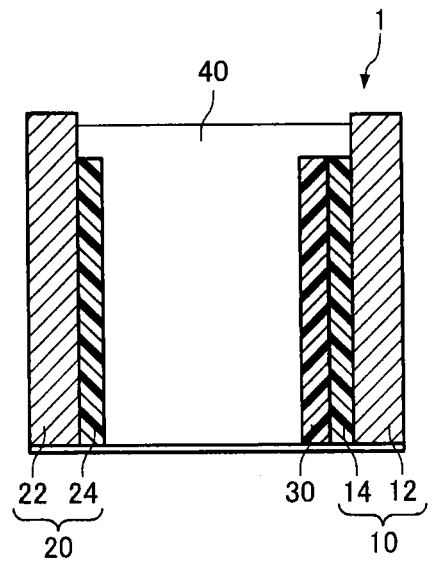
FIG. 1 is a schematic view illustrating the cross section of an electrical storage device according to a first embodiment.

Exemplary embodiments of the invention are described in detail below. Note that the invention is not limited to the following exemplary embodiments. It should be understood that the invention includes various modifications that may be made of the following exemplary embodiments without departing from the scope of the invention.

1. Composition for Forming Protective Film (Protective Film-Forming Composition)

A protective film-forming composition according to a first embodiment of the invention includes polymer particles (A1), polymer particles (A2), and a liquid medium, the polymer particles (A1) including a repeating unit derived from a compound that includes two or more polymerizable unsaturated groups in an amount of less than 15 parts by mass based on 100 parts by mass of the polymer particles (A1), and the polymer particles (A2) including a repeating unit derived from a compound that includes two or more polymerizable unsaturated groups in an amount of 20 to 100 parts by mass based on 100 parts by mass of the polymer particles (A2).

A protective film-forming composition according to a second embodiment of the invention includes polymer particles (A1), polymer particles (A2), and a liquid medium, the polymer particles (A1) being solid particles, and the polymer particles (A2) being particles having a void.

A protective film-forming composition according to a third embodiment of the invention includes polymer particles (A) and a liquid medium, the polymer particles (A) having only one endothermic peak within a temperature range of −50 to +80° C. when subjected to differential scanning calorimetry (DSC) in accordance with JIS K 7121, and decreasing in weight by 10 wt % in an air atmosphere at a temperature of 320° C. or more when subjected to thermogravimetry in accordance with JIS K 7120.

A protective film-forming composition according to a fourth embodiment of the invention includes polymer particles (A) and a liquid medium, the polymer particles (A) having a toluene insoluble content measured at 50° C. of 90% or more.

In recent years, an increase in lifetime of an electrical storage device (drive power supply) has been desired along with an increase in lifetime of an electronic device, and an improvement in charge-discharge characteristics has been strongly desired. Specifically, the following two characteristics have been desired. The electrical storage device has been desired to suppress an increase in internal resistance even when repeatedly charged and discharged a number of times. The electrical storage device has also been desired to suppress an increase in internal resistance even when overcharged. The resistance increase ratio is an index that indicates these characteristics. Specifically, an electrical storage device having a small resistance increase ratio exhibits excellent repeated charge-discharge resistance and overcharge resistance, and exhibits excellent charge-discharge characteristics.

A fluorine-containing organic polymer, a polyamide, a polyimide, and a polyamideimide have been widely used for an electrical storage device due to excellent oxidation resistance, but cannot meet recent severe requirements relating to the resistance increase ratio.

The inventors of the invention conducted extensive studies in view of the above situation, and found that a protective film that is formed using a protective film-forming composition that includes polymer particles (A1) and polymer particles (A2) that respectively include a specific amount of a repeating unit derived from a compound that includes two or more polymerizable unsaturated groups, does not increase the internal resistance of the electrical storage device, and can reduce the resistance increase ratio. This finding has led to the completion of the invention. The polymer particles (A2) are hard particles, and it is considered that the polymer particles (A1) function as a binder for binding the polymer particles (A2). It is conjectured that the resulting protective film thus exhibits improved lithium ion permeability and improved toughness.

The inventors of the invention conducted extensive studies in view of the above situation, and also found that a protective film that is formed using a protective film-forming composition that includes polymer particles (A) that exhibit the above endothermic properties and thermal decomposition behavior, and have a toluene insoluble content within the above range, does not increase the internal resistance of the electrical storage device, and can reduce the resistance increase ratio. This finding has also led to the completion of the invention.

Each component included in the protective film-forming composition is described in detail below. Note that the term "(meth)acrylic acid" used herein refers to "acrylic acid" and "methacrylic acid". The above definition also applies to the term "(meth)acrylonitrile" and similar terms.

1.1. Polymer Particles (A)

The protective film-forming composition according to the embodiments of the invention includes the polymer particles (A). The polymer particles (A) may be produced by appropriately adjusting the monomer polymerization method, or may be a mixture prepared by mixing the polymer particles (A1) and the polymer particles (A2) described later.

The polymer particles (A) may have only one endothermic peak within a temperature range of −50 to +80° C. when subjected to differential scanning calorimetry (DSC) in accordance with JIS K 7121, and have a 10% weight loss temperature (i.e., the temperature at which the weight of the polymer particles (A) decreases by 10 wt % in an air atmosphere) of 320° C. or more when subjected to thermogravimetry (TG) in an air atmosphere in accordance with JIS K 7120.

The polymer particles (A) may have a toluene insoluble content measured at 50° C. of 90% or more.

1.1.1. Toluene Insoluble Content

The polymer particles (A) may have a toluene insoluble content measured at 50° C. of 90% or more, preferably 95% or more, and more preferably 100% or more. It is considered that the toluene insoluble content in the polymer particles (A) is almost proportional to the content of components that are insoluble in an electrolyte solution used for an electrical storage device. When the toluene insoluble content in the polymer particles (A) is within the above range, it is considered that elution of the polymer into the electrolyte solution can be suppressed even when the electrical storage device that is produced using the polymer particles (A) is repeatedly charged and discharged for a long time.

The toluene insoluble content may be calculated as described below. 10 g of an aqueous dispersion including the polymer particles (A) is weighed on a Teflon (registered trademark) petri dish (diameter: 8 cm), and dried at 120° C. for 1 hour to form a film. 1 g of the resulting film (polymer) is immersed in 400 mL of toluene, followed by shaking at 50° C. for 3 hours. After filtering the toluene phase through a wire gauze (300 mesh) to separate insoluble components, toluene included in the filtrate is evaporated off, and the weight (Y (g)) of the residue is measured. The toluene insoluble content is calculated using the following expression (1).

$$\text{Toluene insoluble content (\%)} = ((1-Y)/1) \times 100 \tag{1}$$

1.1.2. Temperature ($T_{10}$) at which Polymer Particles (A) Decrease in Weight by 10 wt % in Air Atmosphere The temperature ($T_{10}$) at which the polymer particles (A1) decrease in weight by 10 wt % in an air atmosphere may be 320° C. or more, and is preferably 350° C. or more. It is considered that the temperature ($T_{10}$) at which the polymer particles (A) decrease in weight by 10 wt % in an air atmosphere correlates to chemical stability to oxidation inside a battery at a high temperature and a high voltage. When the temperature ($T_{10}$) at which the polymer particles (A) decrease in weight by 10 wt % in an air atmosphere is within the above range, stability to oxidation inside a battery at a high temperature and a high voltage is improved, and the polymer particles (A) rarely undergo a decomposition reaction. Therefore, the residual capacity ratio increases.

The temperature ($T_{10}$) at which the polymer particles (A) decrease in weight by 10 wt % in an air atmosphere may be measured as described below. 10 g of an aqueous dispersion including the polymer particles (A) is weighed on a Teflon (registered trademark) petri dish (diameter: 8 cm), and dried at 120° C. for 1 hour to form a film. The film (polymer) is ground to form a powder, which is subjected to thermogravimetry using a thermal analyzer (e.g., "DTG-60A" manufactured by Shimadzu Corporation). A temperature at which the polymer particles (A) have decreased in weight by 10 wt % in an air atmosphere when heated at a temperature increase rate of 20° C./min is taken as the temperature ($T_{10}$).

1.1.3. Endothermic Properties of Polymer Particles (A)

The polymer particles (A) have specific thermal properties in that the polymer particles (A) have only one endothermic peak within a temperature range of −50 to +80° C. when subjected to differential scanning calorimetry (DSC) in accordance with JIS K 7121. It is considered that the endothermic behavior of the polymer particles (A) correlates to the shape stability of the polymer particles. When the polymer particles (A) have an endothermic peak within the above temperature range, it is considered that the shape stability of the polymer particles is improved, and the resulting protective film exhibits sufficient strength.

1.1.4. Repeating Unit Included in Polymer that Forms Polymer Particles (A)

A repeating unit similar to those included in the polymer particles (A1) and the polymer particles (A2) (described below) may preferably be included in the polymer that forms the polymer particles (A).

1.2. Polymer Particles (A1)

The protective film-forming composition according to the embodiments of the invention includes the polymer particles (A1). The polymer particles (A1) include a repeating unit derived from a compound that includes two or more polymerizable unsaturated groups in an amount of less than 15 parts by mass based on 100 parts by mass of the polymer particles (A1). It is preferable that the polymer particles (A1) include a repeating unit derived from a compound that includes two or more polymerizable unsaturated groups in an amount of 5 parts by mass or less, and more preferably 0 parts by mass (i.e., the polymer particles (A1) do not include a repeating unit derived from a compound that includes two or more polymerizable unsaturated groups). When the polymer particles (A1) include a repeating unit derived from a compound that includes two or more polymerizable unsaturated groups in an amount within the above range, the flexibility of the polymer particles (A1) increases, and adhesion between the polymer particles, and adhesion to the separator and the electrode are improved. If the polymer particles (A1) include a repeating unit derived from a compound that includes two or more polymerizable unsaturated groups in an amount outside the above range, the flexibility of the polymer particles (A1) may decrease, and adhesion between the polymer particles, and adhesion between a separator and an electrode may deteriorate.

It is preferable that the polymer particles (A1) function as a binder for binding the polymer particles (A2) described later, and also function as a binder for binding a separator, an electrode, and a protective film. When the polymer particles (A1) function as such a binder, it is preferable that the polymer particles (A1) be solid particles that do not have a void therein. The polymer particles (A1) exhibit excellent binder characteristics when the polymer particles (A1) are solid particles.

A monomer that produces a repeating unit included in the polymer particles (A1), the configuration of the polymer particles (A1), a method for producing the polymer particles (A1), and the like are described in detail below.

1.2.1. Compound that Includes Two or More Polymerizable Unsaturated Groups

Examples of the compound that includes two or more polymerizable unsaturated groups include, but are not limited to, a polyfunctional (meth)acrylate, an aromatic polyfunctional vinyl compound, and the like.

Examples of the polyfunctional (meth)acrylate include a compound represented by the following general formula (2), a (poly)(meth)acrylate of a polyhydric alcohol, and polyfunctional monomers other than these compounds.

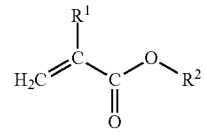

(2)

wherein $R^1$ is a hydrogen atom or a methyl group, $R^2$ is an organic group having 1 to 18 carbon atoms that includes at least one functional group selected from the group consisting of a polymerizable carbon-carbon unsaturated bond, an epoxy group, and a hydroxyl group.

Specific examples of an organic group that is preferable as $R^2$ in the general formula (2) include a vinyl group, an isopropenyl group, an allyl group, a (meth)acryloyl group, an epoxy group, a glycidyl group, a hydroxyalkyl group, and the like.

The term "polyfunctional (meth)acrylate" used herein includes a (meth)acrylate that includes two or more (meth)acryloyl groups, and a (meth)acrylate that includes one (meth)acryloyl group, and further includes at least one functional group selected from the group consisting of a polymerizable carbon-carbon unsaturated bond, an epoxy group, and a hydroxyl group.

Examples of the polyfunctional (meth)acrylate include ethylene glycol(meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, glycidyl(meth)acrylate, hydroxymethyl(meth)acrylate, hydroxyethyl(meth)acrylate, allyl(meth)acrylate, ethylene glycol di(meth)acrylate, propylene glycol di(meth)acrylate, and the like. The polyfunctional (meth)acrylate may be one or more compounds selected from these compounds. It is preferable that the polyfunctional (meth)acrylate be one or more compounds selected from ethylene glycol di(meth)acrylate, trimethylolpropane tri(meth)acrylate, and allyl(meth)acrylate, and particularly preferably ethylene glycol di(meth)acrylate. These polyfunctional (meth)acrylates may be used either alone or in combination.

A compound represented by the following general formula (3) may preferably be used as the aromatic polyfunctional vinyl compound, for example.

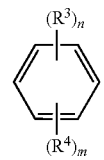

(3)

wherein $R^3$ are independently an organic group that includes a polymerizable carbon-carbon unsaturated bond, $R^4$ is/are independently a hydrocarbon group having 1 to 18 carbon atoms, n is an integer from 2 to 6, and m is an integer from 0 to 4.

Examples of the organic group represented by $R^3$ in the general formula (3) include a vinylene group having 2 to 12 carbon atoms, an allyl group, a vinyl group, an isopropenyl group, and the like. Among these, a vinylene group having 2 to 12 carbon atoms is preferable. Examples of the hydrocarbon group represented by $R^4$ in the general formula (3) include a methyl group, an ethyl group, and the like.

Examples of the aromatic polyfunctional vinyl compound include, but are not limited to, aromatic divinyl compounds such as divinylbenzene and diisopropenylbenzene. Among these, divinylbenzene is preferable. These aromatic polyfunctional vinyl compounds may be used either alone or in combination.

1.2.2. Fluorine Atom-Containing Monomer

It is preferable that the polymer particles (A1) include a repeating unit derived from a fluorine atom-containing monomer. Examples of the fluorine atom-containing monomer include fluorine atom-containing olefin compounds, fluorine atom-containing (meth)acrylates, and the like. Examples of the fluorine atom-containing olefin compounds include vinylidene fluoride, tetrafluoroethylene, hexafluoropropylene, ethylene chloride trifluoride, perfluoroalkyl vinyl ethers, and the like. Examples of the fluorine atom-containing (meth)acrylates include a compound represented by the following general formula (4), 3-[4-[1-trifluoromethyl-2,2-bis[bis(trifluoromethyl)fluoromethyl]ethynyloxy]benzoxy]-2-hydroxypropyl(meth)acrylate, and the like.

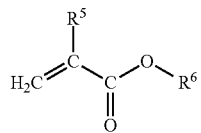

(4)

wherein $R^5$ is a hydrogen atom or a methyl group, and $R^6$ is a fluorine atom-containing hydrocarbon group having 1 to 18 carbon atoms.

Examples of the fluorine atom-containing hydrocarbon group represented by $R^6$ in the general formula (4) include fluoroalkyl groups having 1 to 12 carbon atoms, fluoroaryl groups having 6 to 16 carbon atoms, fluoroaralkyl groups having 7 to 18 carbon atoms, and the like. It is preferable that $R^6$ be a fluoroalkyl group having 1 to 12 carbon atoms. Specific examples of a fluorine atom-containing hydrocarbon group that is preferable as $R^6$ in the general formula (4) include a 2,2,2-trifluoroethyl group, a 2,2,3,3,3-pentafluoropropyl group, a 1,1,1,3,3,3-hexafluoropropan-2-yl group, a beta-(perfluorooctyl)ethyl group, a 2,2,3,3-tetrafluoropropyl group, a 2,2,3,4,4,4-hexafluorobutyl group, a 1H,1H,5H-octafluoropentyl group, a 1H,1H,9H-perfluoro-1-nonyl group, a 1H,1H,11H-perfluoroundecyl group, a perfluorooctyl group, and the like. The fluorine atom-containing monomer is preferably a fluorine atom-containing olefin compound, and more preferably at least one compound selected from the group consisting of vinylidene fluoride, tetrafluoroethylene, and hexafluoropropylene. These fluorine atom-containing monomers may be used either alone or in combination.

It is preferable that the polymer particles (A1) include the repeating unit derived from the fluorine atom-containing monomer in an amount of 5 to 50 parts by mass, more preferably 15 to 40 parts by mass, and particularly preferably 20 to 30 parts by mass, based on 100 parts by mass of the polymer particles (A1).

1.2.3. Unsaturated Carboxylic Acid

It is preferable that the polymer particles (A1) include a repeating unit derived from an unsaturated carboxylic acid in addition to the repeating unit derived from the fluorine atom-containing monomer. Examples of the unsaturated carboxylic acid include monocarboxylic acids and dicarboxylic acids such as acrylic acid, methacrylic acid, crotonic acid, maleic acid, fumaric acid, and itaconic acid. The unsaturated carboxylic acid may be one or more compounds selected from these compounds. It is preferable to use one or more compounds selected from acrylic acid and methacrylic acid as the unsaturated carboxylic acid. It is more preferable to use acrylic acid as the unsaturated carboxylic acid.

It is preferable that the polymer particles (A1) include the repeating unit derived from the unsaturated carboxylic acid in an amount of 1 to 10 parts by mass, and more preferably 2.5 to 7.5 parts by mass, based on 100 parts by mass of the polymer particles (A1).

1.2.4. Conjugated Diene Compound

The polymer particles (A1) may further include a repeating unit derived from a conjugated diene compound. Examples of the conjugated diene compound include 1,3-butadiene, 2-methyl-1,3-butadiene, 2,3-dimethyl-1,3-butadiene, 2-chloro-1,3-butadiene, and the like. The conjugated diene compound may be one or more compounds selected from these compounds. Among these, 1,3-butadiene is particularly preferable.

It is preferable that the polymer particles (A1) include the repeating unit derived from the conjugated diene compound in an amount of 30 to 60 parts by mass, and more preferably 40 to 55 parts by mass, based on 100 parts by mass of the polymer particles (A1). When the polymer particles (A1) include the repeating unit derived from the conjugated diene compound in an amount within the above range, it is possible to provide the polymer particles (A1) with moderate flexibility, and the binding/bonding capability of the polymer particles (adhesion between the polymer particles) is improved.

1.2.5. Additional Unsaturated Monomer

The polymer particles (A1) may further include a repeating unit derived from an additional unsaturated monomer that is copolymerizable with the above monomers in addition to the repeating units derived from the above monomers.

Examples of the additional unsaturated monomer include an unsaturated carboxylic ester (excluding a compound that falls under the compound that includes two or more polymerizable unsaturated groups, and the fluorine atom-containing monomer), an alpha,beta-unsaturated nitrile compound, an aromatic vinyl compound (excluding a compound that falls under the compound that includes two or more polymerizable unsaturated groups), and monomers other than these compounds.

A (meth)acrylate may preferably be used as the unsaturated carboxylic ester. Examples of the (meth)acrylate include an alkyl(meth)acrylate, a cycloalkyl(meth)acrylate, and the like. An alkyl(meth)acrylate having 1 to 10 carbon atoms is preferable as the alkyl(meth)acrylate. Examples of the alkyl(meth)acrylate having 1 to 10 carbon atoms include methyl(meth)acrylate, ethyl(meth)acrylate, n-propyl(meth)acrylate, i-propyl(meth)acrylate, n-butyl(meth)acrylate, i-butyl(meth)acrylate, n-amyl(meth)acrylate, i-amyl(meth)acrylate, hexyl(meth)acrylate, 2-ethylhexyl(meth)acrylate, n-octyl(meth)acrylate, nonyl(meth)acrylate, decyl(meth)

acrylate, and the like. Examples of the cycloalkyl(meth)acrylate include cyclohexyl(meth)acrylate and the like. These unsaturated carboxylic esters may be used either alone or in combination. Among these, it is preferable to use an alkyl(meth)acrylate. It is more preferable to use one or more compounds selected from methyl(meth)acrylate, ethyl (meth)acrylate, n-butyl(meth)acrylate, and 2-ethylhexyl (meth)acrylate.

Examples of the alpha,beta-unsaturated nitrile compound include acrylonitrile, methacrylonitrile, alpha-chloroacrylonitrile, alpha-ethylacrylonitrile, vinylidene cyanide, and the like. One or more compounds selected from these compounds may be used as the alpha,beta-unsaturated nitrile compound. It is preferable to use one or more compounds selected from the group consisting of acrylonitrile and methacrylonitrile. It is particularly preferable to use acrylonitrile.

Examples of the aromatic vinyl compound include styrene, alpha-methylstyrene, p-methylstyrene, vinyltoluene, chlorostyrene, and the like. One or more compounds selected from these compounds may be used as the aromatic vinyl compound. It is particularly preferable to use styrene as the aromatic vinyl compound.

Examples of the monomers other than these compounds include alkylamides of an unsaturated carboxylic acid, such as (meth)acrylamide and N-methylolacrylamide; aminoalkylamides of an unsaturated carboxylic acid, such as aminoethylacrylamide, dimethylaminomethylmethacrylamide, and methylaminopropylmethacrylamide; and the like. One or more compounds selected from these compounds may be used.

1.2.6. Number Average Particle Size (Da1) of Polymer Particles (A1)

It is preferable that the polymer particles (A1) have a number average particle size (Da1) of 20 to 450 nm, more preferably 30 to 420 nm, and particularly preferably 50 to 400 nm.

When the number average particle size (Da1) of the polymer particles (A1) is within the above range, the stability of the composition is improved, and an increase in internal resistance (resistance increase ratio) can be suppressed even if the protective film is formed in the electrical storage device. If the number average particle size (Da1) is less than the above range, the solubility of the polymer particles (A1) in the electrolyte solution increases due to an increase in surface area. As a result, the polymer particles (A1) may be gradually eluted into the electrolyte solution when the electrical storage device is repeatedly charged and discharged, and an increase in internal resistance may occur. If the number average particle size (Da1) exceeds the above range, adhesion of the polymer particles (A1) decreases due to a decrease in surface area. As a result, it may be difficult to form a strong protective film, and the electrical storage device may exhibit insufficient durability.

Note that the number average particle size (Da1) of the polymer particles (A1) refers to a particle size (D50) corresponding to 50% in the cumulative particle size distribution measured using a particle size distribution analyzer that utilizes a light scattering method as the measurement principle. Examples of such a particle size distribution analyzer include Coulter LS230, Coulter LS100, Coulter LS13 320 (manufactured by Beckman Coulter, Inc.); FPAR-1000 (Otsuka Electronics Co., Ltd.); and the like. These particle size distribution analyzers can measure the particle size distribution of the primary particles of the polymer particles (A1), and can also measure the particle size distribution of the secondary particles that are formed through aggregation of the primary particles. Therefore, the particle size distribution measured by these particle size distribution analyzers can be used as an index of the dispersion state of the polymer particles (A1) included in the composition.

1.2.7. Toluene Insoluble Content

The toluene insoluble content in the polymer particles (A1) is preferably 80% or more, and more preferably 85% or more. It is considered that the toluene insoluble content in the polymer particles (A1) is almost proportional to the content of components that are insoluble in an electrolyte solution used for an electrical storage device. When the toluene insoluble content in the polymer particles (A1) is within the above range, it is considered that elution of the polymer into the electrolyte solution can be suppressed even when the electrical storage device that is produced using the polymer particles (A1) is repeatedly charged and discharged for a long time. The toluene insoluble content may be calculated as described above in connection with the polymer particles (A).

1.2.8. Temperature ($T_{10}$) at which Polymer Particles (A1) Decrease in Weight by 10 wt % in Air Atmosphere The temperature ($T_{10}$) at which the polymer particles (A1) decrease in weight by 10 wt % in an air atmosphere is preferably 320° C. or more, and more preferably 350° C. or more. It is considered that the temperature ($T_{10}$) at which the polymer particles (A1) decrease in weight by 10 wt % in an air atmosphere correlates to chemical stability to oxidation inside a battery at a high temperature and a high voltage. When the temperature ($T_{10}$) at which the polymer particles (A1) decrease in weight by 10 wt % in an air atmosphere is within the above range, stability to oxidation inside a battery at a high temperature and a high voltage is improved, and the polymer particles rarely undergo a decomposition reaction. Therefore, the residual capacity ratio increases. The temperature ($T_{10}$) at which the polymer particles (A1) decrease in weight by 10 wt % in an air atmosphere may be measured as described above in connection with the polymer particles (A).

1.2.9. Configuration of Polymer Particles (A1)

When producing the polymer particles (A1) using the fluorine atom-containing monomer, the polymer particles (A1) may be (1) copolymer particles obtained by synthesizing the polymer particles (A1) that include a repeating unit derived from the fluorine atom-containing monomer through single-step polymerization, or (2) composite particles that include a polymer X that includes a repeating unit derived from the fluorine atom-containing monomer, and a polymer Y that includes a repeating unit derived from the unsaturated carboxylic acid. It is preferable that the polymer particles (A1) be the composite particles due to excellent oxidation resistance. It is more preferable that the composite particles be polymer alloy particles.

The term "polymer alloy" is defined in *Iwanami Rikagaku Jiten* (5th ed., Iwanami Shoten, Publishers) as "a generic name for multi-component polymers that are obtained by mixing or chemically bonding two or more polymers". The term "polymer alloy" defined in *Iwanami Rikagaku Jiten* refers to "a polymer blend in which different polymers are physically mixed, a block or graft copolymer in which different polymer components are covalently bonded, a polymer complex in which different polymers are associated due to an intermolecular force, an interpenetrating polymer network (IPN) in which different polymers are entangled, and the like". Note that the polymer alloy included in the protective film-forming composition is formed of an IPN in which different polymer components are not covalently bonded.

It is considered that the polymer X that forms the polymer alloy particles exhibits an excellent electrolyte solution permeability-retention capability, and hard segments formed of a crystalline resin aggregate in the polymer X to form a pseudo crosslinking point (e.g., C-H . . . F-C) in the main chain. When only the polymer X is mixed with the polymer particles (A2), and used to form a protective film of an electrical storage device, an excellent electrolyte solution permeability-retention capability and excellent oxidation resistance are achieved, but adhesion and flexibility tend to be insufficient. As a result, it may be impossible to sufficiently bind the polymer particles (A2) included in the protective film, and the protective film may become inhomogeneous due to removal of the polymer particles (A2), for example. Therefore, it may be impossible to obtain an electrical storage device having a small resistance increase ratio. The polymer Y that forms the polymer alloy particles exhibits excellent adhesion and flexibility, but tends to exhibit poor oxidation resistance. Therefore, when only the polymer Y is used to form the protective film of the electrical storage device, oxidative decomposition may occur due to repeated charge and discharge, or overcharge, and it may be impossible to obtain an electrical storage device having a small resistance increase ratio.

In contrast, an electrical storage device that exhibits an electrolyte solution permeability-retention capability, oxidation resistance, adhesion, and flexibility at the same time, and has a small resistance increase ratio, can be produced by utilizing the polymer alloy particles that include the polymer X and the polymer Y. Note that oxidation resistance can be further improved when the polymer alloy particles include only the polymer X and the polymer Y.

It is preferable that the polymer alloy particles have only one endothermic peak within the temperature range of −50 to +250° C. when subjected to differential scanning calorimetry (DSC) in accordance with JIS K 7121. It is more preferable that the polymer alloy particles have the only one endothermic peak within the temperature range of −30 to +80° C.

The polymer X that forms the polymer alloy particles normally has an endothermic peak (melting temperature) at −50 to +250° C. when the polymer X is present alone. The polymer Y that forms the polymer alloy particles normally has an endothermic peak (glass transition temperature) that differs from that of the polymer X. Therefore, when the polymer X and the polymer Y are present in the polymer particles (A1) in a phase separation state (e.g., core-shell structure), two endothermic peaks should be detected within the temperature range of −50 to +250° C. When the polymer particles (A1) have only one endothermic peak within the temperature range of −50 to +250° C., it is considered that the polymer particles (A1) are polymer alloy particles.

When the polymer particles (A1) (polymer alloy particles) have only one endothermic peak within the temperature range of −30 to +80° C., the polymer particles (A1) provide excellent flexibility and tackiness, and further improve adhesion.

The polymer X may further include a repeating unit derived from an unsaturated monomer in addition to the repeating unit derived from the fluorine atom-containing monomer. Examples of the unsaturated monomer include the unsaturated carboxylic acids, the unsaturated carboxylic esters, the alpha,beta-unsaturated nitrile compounds, and the like mentioned above.

It is preferable that the polymer X include the repeating unit derived from the fluorine atom-containing monomer in an amount of 80 parts by mass or more, and more preferably 90 parts by mass or more, based on 100 parts by mass of the polymer X. In this case, it is preferable that the fluorine atom-containing monomer be at least one compound selected from the group consisting of vinylidene fluoride, tetrafluoroethylene, and hexafluoropropylene.

It is more preferable that the polymer X include a repeating unit derived from vinylidene fluoride in an amount of 50 to 99 parts by mass, and more preferably 80 to 98 parts by mass, based on 100 parts by mass of the polymer X, include a repeating unit derived from tetrafluoroethylene in an amount of 50 parts by mass or less, more preferably 1 to 30 parts by mass, and particularly preferably 2 to 20 parts by mass, based on 100 parts by mass of the polymer X, and/or include a repeating unit derived from hexafluoropropylene in an amount of 50 parts by mass or less, more preferably 1 to 30 parts by mass, and particularly preferably 2 to 25 parts by mass, based on 100 parts by mass of the polymer X. It is most preferable that the polymer X include only a repeating unit derived from at least one compound selected from the group consisting of vinylidene fluoride, tetrafluoroethylene, and hexafluoropropylene.

The polymer Y may further include a repeating unit derived from an additional unsaturated monomer in addition to the repeating unit derived from the unsaturated carboxylic acid. Examples of the additional unsaturated monomer include the unsaturated carboxylic esters, the alpha,beta-unsaturated nitrile compounds, and the like mentioned above.

It is preferable that the polymer Y include the repeating unit derived from the unsaturated carboxylic acid in an amount of 2 to 20 parts by mass, and more preferably 3 to 15 parts by mass, based on 100 parts by mass of the polymer Y.

The polymer alloy particles may be synthesized using an arbitrary method as long as the polymer alloy particles have the above configuration. For example, the polymer alloy particles can be easily synthesized using a known emulsion polymerization method, or an appropriate combination of known emulsion polymerization methods.

For example, the polymer X that includes the repeating unit derived from the fluorine atom-containing monomer is synthesized using a known method. After the addition of the monomer used to produce the polymer Y to the polymer X, the monomer is allowed to be sufficiently absorbed by the network structure of the polymer X (polymer particles), and polymerized in the network structure of the polymer X to synthesize the polymer Y. The polymer alloy particles can thus be easily produced. When producing the polymer alloy particles using the above method, it is indispensable to allow the monomer used to produce the polymer Y to be sufficiently absorbed by the polymer X. If the absorption temperature is too low, or the absorption time is too short, a core-shell polymer, or a polymer in which only part of the surface layer has an IPN structure, may be obtained (i.e., the desired polymer alloy particles may not be obtained). If the absorption temperature is too high, the pressure inside the polymerization system may increase to a large extent, and it may be difficult to handle the reaction system, and control the reaction. Further advantageous results are not obtained even if the absorption time is increased to a large extent.

It is preferable to set the absorption temperature to 30 to 100° C., and more preferably 40 to 80° C. It is preferable to set the absorption time to 1 to 12 hours, and more preferably 2 to 8 hours. It is preferable to increase the absorption time when the absorption temperature is low. It suffices to employ a short absorption time when the absorption temperature is high. It is preferable to employ conditions whereby a value obtained by multiplying the absorption temperature (° C.) by the absorption time (h) is about 120 to about 300 (° C.·h), and more preferably 150 to 250 (° C.·h).

It is preferable to allow the monomer used to produce the polymer Y to be absorbed by the network structure of the polymer X in a known medium (e.g., water) that is used for emulsion polymerization.

It is preferable that the polymer alloy particles include the polymer X in an amount of 5 to 50 parts by mass, more preferably 15 to 40 parts by mass, and particularly preferably 20 to 30 parts by mass, based on 100 parts by mass of the polymer alloy particles. When the polymer alloy particles include the polymer X in an amount within the above range, it is possible to achieve an electrolyte solution permeability-retention capability, oxidation resistance, and adhesion in a well-balanced manner. When using the polymer Y that includes the repeating unit derived from each monomer in an amount within the above preferable range, the polymer alloy particles include each repeating unit in an amount within the above preferable range when the polymer alloy particles include the polymer X within the above range. Since the ethylene carbonate (EC)/diethyl carbonate (DEC) insoluble content can thus be set to an appropriate value, the resulting electrical storage device has a sufficiently small resistance increase ratio.

1.2.10. Method for Producing Polymer Particles (A1)

When producing the polymer particles (A1) that include the repeating unit derived from the fluorine atom-containing monomer, the polymer particles (A1) may be produced (i.e., single-step polymerization of the polymer that includes the repeating unit derived from the fluorine atom-containing monomer, polymerization of the polymer X, and polymerization of the polymer Y in the presence of the polymer X) in the presence of a known initiator, molecular weight modifier, emulsifier (surfactant), and the like.

When producing the polymer particles (A1) that include the repeating unit derived from the conjugated diene compound, the polymer particles (A1) may be produced by single-step polymerization, two-step polymerization, or multi-step polymerization, in the presence of a known initiator, molecular weight modifier, emulsifier (surfactant), and the like.

Examples of the initiator include water-soluble initiators such as sodium persulfate, potassium persulfate, and ammonium persulfate; oil-soluble initiators such as benzoyl peroxide, lauryl peroxide, and 2,2'-azobisisobutyronitrile; redox initiators that include a reducing agent (e.g., sodium bisulfite, iron(II) salt, or tertiary amine) and an oxidizing agent (e.g., persulfate or organic peroxide); and the like. These initiators may be used either alone or in combination.

When producing the polymer particles (A1) that include the repeating unit derived from the fluorine atom-containing monomer, the initiator is preferably used in an amount of 0.3 to 3 parts by mass based on 100 parts by mass of the total monomer (i.e., the total monomer used when producing the polymer particles (A1) by single-step polymerization, the total monomer that produces the polymer X when producing the polymer X, or the total monomer that produces the polymer Y when producing the polymer Y in the presence of the polymer X (hereinafter the same)).

Examples of the molecular weight modifier include halogenated hydrocarbons such as chloroform and carbon tetrachloride; mercaptan compounds such as n-hexylmercaptan, n-octylmercaptan, n-dodecylmercaptan, t-dodecylmercaptan, and thioglycolic acid; xanthogen compounds such as dimethyl xanthogen disulfide and diisopropyl xanthogen disulfide; terpinolene; an alpha-methylstyrene dimer; and the like. These molecular weight modifiers may be used either alone or in combination. The molecular weight modifier is preferably used in an amount of 5 parts by mass or less based on 100 parts by mass of the total monomer.

Examples of the emulsifier include an anionic surfactant, a nonionic surfactant, an amphoteric surfactant, a fluorine-based surfactant, and the like.

Examples of the anionic surfactant include a sulfate of a higher alcohol, an alkylbenzenesulfonate, an aliphatic sulfonate, a sulfate of a polyethylene glycol alkyl ether, and the like. Examples of the nonionic surfactant include an alkyl ester of polyethylene glycol, an alkyl ether of polyethylene glycol, an alkyl phenyl ether of polyethylene glycol, and the like.

Examples of the amphoteric surfactant include a compound in which an anion moiety is a carboxylate, a sulfate salt, a sulfonate, a phosphate salt, or the like, and a cation moiety is an amine salt, a quaternary ammonium salt, or the like. Specific examples of the amphoteric surfactant include betaine compounds such as lauryl betaine and stearyl betaine; and amino acid-type surfactants such as lauryl-beta-alanine, lauryl-di(aminoethyl)glycine, and octyl-di(aminoethyl)glycine.

Examples of the fluorine-based surfactant include a fluorobutylsulfonate, a phosphate that includes a fluoroalkyl group, a carboxylate that includes a fluoroalkyl group, a fluoroalkyl ethylene oxide adduct, and the like. Examples of a commercially available product of the fluorine-based surfactant include EFTOP EF301, EFTOP EF303, and EFTOP EF352 (manufactured by Tohkem Products Corporation); Megafac F171, Megafac F172, and Megafac F173 (manufactured by DIC Corporation); Fluorad FC430 and Fluorad FC431 (manufactured by Sumitomo 3M, Ltd.); Asahi Guard AG710, Surflon S-381, Surflon SC-382, Surflon SC101, Surflon SC102, Surflon SC103, Surflon SC104, Surflon SC105, Surflon SC106, Surfynol E1004, Surfynol KH-10, Surfynol KH-20, Surfynol KH-30, and Surfynol KH-40 (manufactured by Asahi Glass Co., Ltd.); Ftergent 250, Ftergent 251, Ftergent 222F, and Ftergent FTX-218 (manufactured by NEOS Co., Ltd.); and the like. These emulsifiers may be used either alone or in combination.

The emulsifier is preferably used in an amount of 0.01 to 10 parts by mass, and more preferably 0.02 to 5 parts by mass, based on 100 parts by mass of the total monomer.

It is preferable to effect emulsion polymerization in an appropriate aqueous medium. It is particularly preferable to effect emulsion polymerization in water. The total monomer concentration in the aqueous medium may be 10 to 50 mass %, and is preferably 20 to 40 mass %.

It is preferable to effect emulsion polymerization at 40 to 85° C. for 2 to 24 hours. It is more preferable to effect emulsion polymerization at 50 to 80° C. for 3 to 20 hours.

1.3. Polymer Particles (A2)

The protective film-forming composition according to the embodiments of the invention includes the polymer particles (A2). The polymer particles (A2) include a repeating unit derived from a compound that includes two or more polymerizable unsaturated groups in an amount of 20 to 100 parts by mass, preferably 20 parts by mass or more, more preferably 50 parts by mass or more, still more preferably 80 parts by mass or more, and particularly preferably 90 parts by mass or more, based on 100 parts by mass of the polymer particles (A2).

When the polymer particles (A2) include a repeating unit derived from a compound that includes two or more polymerizable unsaturated groups in an amount within the above range, a protective film produced using the protective film-forming composition exhibits improved heat resistance, solvent resistance, and function of preventing a short circuit due to dendrites. The protective film-forming composition according to the embodiments of the invention that includes the polymer particles (A2) can produce a protective film that exhibits improved toughness.

A monomer that produces a repeating unit included in the polymer particles (A2), the configuration of the polymer particles (A2), a method for producing the polymer particles (A2), and the like are described in detail below.

1.3.1. Compound that Includes Two or More Polymerizable Unsaturated Groups

Examples of the compound that includes two or more polymerizable unsaturated groups include those mentioned above in connection with the polymer particles (A1). At least one compound selected from the group consisting of the polyfunctional (meth)acrylates and the aromatic polyfunctional vinyl compounds mentioned above may preferably be used as the compound that includes two or more polymerizable unsaturated groups. It is more preferable to use an aromatic divinyl compound (particularly preferably divinylbenzene) as the compound that includes two or more polymerizable unsaturated groups. When the polymer particles (A1) include a repeating unit derived from a compound that includes two or more polymerizable unsaturated groups, it is preferable that the repeating unit derived from the compound that includes two or more polymerizable unsaturated groups included in the polymer particles (A2) be identical with the repeating unit derived from the compound that includes two or more polymerizable unsaturated groups included in the polymer particles (A1).

When producing the polymer particles (A2) that include a repeating unit derived from divinylbenzene, the content of divinylbenzene is preferably 20 to 100 mass %, more preferably 50 to 100 mass %, and particularly preferably 80 to 100 mass %, based on the total monomer. If the content of divinylbenzene is less than 20 mass %, the resulting polymer particles (A2) may exhibit inferior heat resistance and electrolyte solution resistance.

1.3.2. Additional Unsaturated Monomer

The polymer particles (A2) may further include a repeating unit derived from an additional unsaturated monomer that is copolymerizable with the compound that includes two or more polymerizable unsaturated groups in addition to the repeating unit derived from the compound that includes two or more polymerizable unsaturated groups.

Examples of the additional unsaturated monomer include the unsaturated carboxylic esters (excluding a compound that falls under the compound that includes two or more polymerizable unsaturated groups), the aromatic vinyl compounds (excluding a compound that falls under the compound that includes two or more polymerizable unsaturated groups), the unsaturated carboxylic acids, the alpha,beta-unsaturated nitrile compounds, and the like mentioned above in connection with the polymer particles (A1). It is preferable that the polymer particles (A2) include a repeating unit derived from an unsaturated carboxylic ester and a repeating unit derived from an aromatic vinyl compound in addition to the repeating unit derived from the compound that includes two or more polymerizable unsaturated groups.

It is preferable that the polymer particles (A2) include the repeating unit derived from the unsaturated carboxylic ester in an amount of 5 to 80 parts by mass, and more preferably 10 to 75 parts by mass, based on 100 parts by mass of the polymer particles (A2).

It is preferable that the polymer particles (A2) include the repeating unit derived from the aromatic vinyl compound in an amount of 5 to 85 parts by mass, and more preferably 10 to 80 parts by mass, based on 100 parts by mass of the polymer particles (A2).

1.3.3. Number Average Particle Size (Da2) of Polymer Particles (A2)

It is preferable that the polymer particles (A2) have a number average particle size (Da2) of 100 to 3000 nm, and more preferably 100 to 1500 nm. It is preferable that the number average particle size (Da2) of the polymer particles (A2) be larger than the average pore size of a separator (porous membrane). This makes it possible to reduce damage to the separator, and prevent a situation in which the pores of the separator are clogged by the polymer particles (A2).

The number average particle size (Da2) of the polymer particles (A2) may be measured as described above in connection with the polymer particles (A1).

It is preferable that the ratio (Da2/Da1) of the number average particle size (Da2) of the polymer particles (A2) to the number average particle size (Da1) of the polymer particles (A1) be 1 to 30. When the ratio (Da2/Da1) is within the above range, the polymer particles (A1) are easily concentrated at the contact points between the polymer particles (A2) (i.e., adhesion between the particles is improved) when forming a protective film by applying and drying the protective film-forming composition. As a result, the resulting protective film exhibits an excellent shape retention capability.

1.3.4. Toluene Insoluble Content

The toluene insoluble content in the polymer particles (A2) is preferably 90% or more, more preferably 95% or more, and most preferably 100% (i.e., the polymer particles (A2) are not dissolved in toluene). It is considered that the toluene insoluble content in the polymer particles (A2) is almost proportional to the content of components that are insoluble in an electrolyte solution used for an electrical storage device. When the toluene insoluble content in the polymer particles (A2) is within the above range, it is considered that elution of the polymer into the electrolyte solution can be suppressed even when the electrical storage device that is produced using the polymer particles (A2) is repeatedly charged and discharged for a long time, and a change in mechanical properties of the protective film can be suppressed. The toluene insoluble content may be calculated as described above in connection with the polymer particles (A).

1.3.5. Temperature ($T_{10}$) at which Polymer Particles (A2) Decrease in Weight by 10 wt % in Air Atmosphere The temperature ($T_{10}$) at which the polymer particles (A2) decrease in weight by 10 wt % in an air atmosphere is preferably 320° C. or more, and more preferably 350° C. or more. It is considered that the temperature ($T_{10}$) at which the polymer particles (A2) decrease in weight by 10 wt % in an air atmosphere correlates to chemical stability to oxidation inside a battery at a high temperature and a high voltage. When the temperature ($T_{10}$) at which the polymer particles (A2) decrease in weight by 10 wt % in an air atmosphere is within the above range, stability to oxidation inside a battery at a high temperature and a high voltage is improved, and the polymer particles rarely undergo a decomposition reaction. Therefore, the residual capacity ratio increases. The temperature ($T_{10}$) at which the polymer particles (A2) decrease in weight by 10 wt % in an air atmosphere may be measured as described above in connection with the polymer particles (A).

1.3.6. Configuration of Polymer Particles (A2)

The polymer particles (A2) do not have an endothermic peak within the temperature range of −50 to +300° C. when subjected to differential scanning calorimetry (DSC) in accordance with JIS K 7121. This means that the polymer particles (A2) are crosslinked by the compound that includes two or more polymerizable unsaturated groups. This makes it possible to provide a protective film formed using the protective film-forming composition with heat resistance and strength.

It is preferable that the polymer particles (A2) be particles having one or more voids therein. When the polymer particles (A2) have one or more voids therein, it is possible to improve the electrolyte solution permeability-retention capability of the resulting protective film, and achieve excellent charge-discharge characteristics. The polymer particles (A2) may have a hollow structure in which a void is formed in the inner part of the particle, or may have a core-shell structure in which a plurality of voids are formed from the surface to the inner part (core) of the particle, for example.

When the polymer particles (A2) have one or more voids therein, it is preferable that the polymer particles (A2) have a volume porosity of 1 to 80%, more preferably 2 to 70%, and particularly preferably 5 to 60%. When the polymer particles (A2) have a volume porosity within the above range, it is possible to improve the electrolyte solution permeability-retention capability and the toughness of the resulting protective film.

The volume porosity of the polymer particles (A2) is determined by observing the polymer particles (A2) using an electron microscope ("H-7650" manufactured by Hitachi High-Technologies Corporation) to measure the average particle size and the inner diameter of one hundred particles randomly sampled from the observed polymer particles (A2), and calculating the volume porosity using the following expression (5).

$$\text{Volume porosity (\%)}=((\text{inner diameter})^3/(\text{average particle size})^3)\times 100 \quad (5)$$

1.3.7. Method for Producing Polymer Particles (A2)

The polymer particles (A2) included in the protective film-forming composition according to the embodiments of the invention may be synthesized using an arbitrary method as long as the polymer particles (A2) have the above configuration. It is preferable to synthesize the polymer particles (A2) by emulsion polymerization, seed emulsion polymerization, suspension polymerization, seed suspension polymerization, solution precipitation polymerization, or the like. Among these, emulsion polymerization and seed emulsion polymerization are preferable. It is particularly preferable to use seed emulsion polymerization since the particle size distribution can be easily controlled to be uniform.

The polymer particles (A2) having a hollow structure may be synthesized using the method disclosed in JP-A-2002-30113, JP-A-2009-120784, or JP-A-62-127336. The polymer particles (A2) having a core-shell structure may be synthesized using the method disclosed in JP-A-4-98201.

1.4. Liquid Medium

The protective film-forming composition according to the embodiments of the invention includes the liquid medium. The liquid medium is preferably an aqueous medium that includes water. The aqueous medium may include a small amount of non-aqueous medium in addition to water. Examples of the non-aqueous medium include amide compounds, hydrocarbons, alcohols, ketones, esters, amine compounds, lactones, sulfoxides, sulfone compounds, and the like. These non-aqueous media may be used either alone or in combination. The content of the non-aqueous medium in the aqueous medium is preferably 10 mass % or less, and more preferably 5 mass % or less. It is most preferable that the aqueous medium include only water.

When the protective film-forming composition according to the embodiments of the invention includes the aqueous medium (that preferably includes only water) as the liquid medium, the protective film-forming composition has a low environmental impact, and is highly safe for the worker.

1.5. Additional Component

The protective film-forming composition according to the embodiments of the invention may optionally include an additional component such as a thickener and a surfactant.

1.5.1. Thickener

The protective film-forming composition according to the embodiments of the invention may include a thickener in order to improve the applicability of the protective film-forming composition. Examples of the thickener include cellulose compounds such as carboxymethyl cellulose, methyl cellulose, hydroxypropyl cellulose, hydroxypropylmethyl cellulose, and hydroxyethyl cellulose; ammonium salts or alkali metal salts of the above cellulose compounds; polycarboxylic acids such as poly(meth)acrylic acid and a modified poly(meth)acrylic acid; alkali metal salts of the polycarboxylic acids; polyvinyl alcohol-based (co)polymers such as polyvinyl alcohol, a modified polyvinyl alcohol, and an ethylene/vinyl alcohol copolymer; water-soluble polymers such as a saponified product of a copolymer of a vinyl ester and an unsaturated carboxylic acid (e.g., (meth)acrylic acid, maleic acid, or fumaric acid); and the like. It is particularly preferable to use an alkali metal salt of carboxymethyl cellulose, hydroxypropyl methylcellulose, hydroxyethyl cellulose, an alkali metal salt of poly(meth)acrylic acid, or the like as the thickener.

Examples of a commercially available alkali metal salt of carboxymethyl cellulose include CMC1120, CMC1150, CMC2200, CMC2280, and CMC2450 (manufactured by Daicel Corporation); Metolose SH and Metolose SE (manufactured by Shin-Etsu Chemical Co., Ltd.); and the like.

When the protective film-forming composition according to the embodiments of the invention includes the thickener, the content of the thickener in the protective film-forming composition is preferably 5 mass % or less, and more preferably 0.1 to 3 mass %, based on the total solid content in the protective film-forming composition.

1.5.2. Surfactant

The protective film-forming composition according to the embodiments of the invention may include a surfactant in order to improve the dispersibility and the dispersion stability of the protective film-forming composition. Examples of the surfactant include those mentioned above (see "1.2.10. Method for producing polymer particles (A1)").

1.6. Method for Preparing Protective Film-Forming Composition

It is preferable that the protective film-forming composition according to the embodiments of the invention include the polymer particles (A1) in an amount of 0.1 to 2000 parts by mass, more preferably 3 to 1500 parts by mass, and particularly preferably 5 to 1000 parts by mass, based on 100 parts by mass of the polymer particles (A2). Note that the preferable range of the amount of the polymer particles (A1) differs between the case of forming the protective film on the surface of the positive electrode or the negative electrode, or the surface of the separator, and the case of forming the protective film as an adhesive layer that is provided between the positive electrode or the negative electrode, and the separator.

When forming the protective film on the surface of the positive electrode or the negative electrode or the surface of the separator, using the protective film-forming composition according to the embodiments of the invention, it is preferable that the protective film-forming composition include the polymer particles (A1) in an amount of 0.1 to 15 parts by mass, more preferably 3 to 12 parts by mass, and particularly preferably 5 to 10 parts by mass, based on 100 parts by mass of the polymer particles (A2). When the protective film-forming composition includes the polymer particles (A1) and the polymer particles (A2) in amounts within the above range, the resulting protective film exhibits toughness and lithium ion permeability in a well-balanced manner, and the resistance increase ratio of the resulting electrical storage device can be further reduced.

When forming the protective film as an adhesive layer that is provided between the positive electrode or the negative electrode, and the separator, using the protective film-forming composition according to the embodiments of the invention, it is preferable that the protective film-forming composition include the polymer particles (A1) in an amount of 1 to 2000 parts by mass, more preferably 5 to 1500 parts by mass, and particularly preferably 10 to 1000 parts by mass, based on 100 parts by mass of the polymer particles (A2). When the protective film-forming composition includes the polymer particles (A1) and the polymer particles (A2) in amounts within the above range, the resulting protective film exhibits adhesion to the electrode and lithium ion permeability in a well-balanced manner, and the resistance increase ratio of the resulting electrical storage device can be further reduced.

The protective film-forming composition according to the embodiments of the invention is prepared by mixing the polymer particles (A1), the polymer particles (A2), and an optional additional component. Examples of a mixing means include a ball mill, a sand mill, a pigment disperser, a grinder, an ultrasonic disperser, a homogenizer, a planetary mixer, a Hobart mixer, and the like.

When mixing (stirring) the components to prepare the protective film-forming composition according to the embodiments of the invention, it is necessary to select a mixer that can stir the components so that aggregates of the polymer particles (A2) do not remain in the resulting protective film-forming composition, and select necessary and sufficient dispersion conditions. It is preferable to mix and disperse the components so that at least aggregates having a size larger than 20 micrometers do not remain in the resulting protective film-forming composition. The degree of dispersion may be measured using a grind gauge.

The electrical storage device protective film-forming composition described above can produce an electrode provided with a protective film that ensures excellent adhesion between the polymer particles (A2), excellent adhesion between the polymer particles (A2) and the electrode, and excellent adhesion between the polymer particles (A2) and the separator. An electrical storage device that includes such an electrode has a sufficiently low resistance increase ratio.

2. Electrical Storage Device

An electrical storage device according to one embodiment of the invention is described in detail below with reference to the drawings. The electrical storage device according to one embodiment of the invention includes a positive electrode, a negative electrode, a protective film that is placed between the positive electrode and the negative electrode, and an electrolyte solution, the protective film being formed using the above protective film-forming composition. First to third embodiments are described below with reference to the drawings.

2.1 First Embodiment

FIG. 1 is a schematic view illustrating the cross section of an electrical storage device according to the first embodiment. As illustrated in FIG. 1, an electrical storage device 1 includes a positive electrode 10 that is formed by forming a positive electrode active material layer 14 on the surface of a positive electrode current collector 12, a negative electrode 20 that is formed by forming a negative electrode active material layer 24 on the surface of a negative electrode current collector 22, a protective film 30 that is provided between the positive electrode 10 and the negative electrode 20, and an electrolyte solution 40 with which the space between the positive electrode 10 and the negative electrode 20 is filled. In the electrical storage device 1, a separator is not provided between the positive electrode 10 and the negative electrode 20. A situation in which the positive electrode 10 and the negative electrode 20 come in contact with each other, and are short-circuited does not occur as long as the positive electrode 10 and the negative electrode 20 are sufficiently secured by a solid electrolyte or the like.

Although the positive electrode 10 illustrated in FIG. 1 has a configuration in which the positive electrode active material layer 14 is not formed on one side of the positive electrode current collector 12 that extends in the longitudinal direction so that the positive electrode current collector 12 is exposed, the positive electrode active material layer 14 may be formed on each side of the positive electrode current collector 12. Although the negative electrode 20 illustrated in FIG. 1 has a configuration in which the negative electrode active material layer 24 is not formed on one side of the negative electrode current collector 22 that extends in the longitudinal direction so that the negative electrode current collector 22 is exposed, the negative electrode active material layer 24 may be formed on each side of the negative electrode current collector 22.

A metal foil, an etched metal foil, an expanded metal, or the like may be used as the positive electrode current collector 12. Specific examples of a material for forming the positive electrode current collector 12 include a metal such as aluminum, copper, nickel, tantalum, stainless steel, and titanium. An appropriate material may be selected depending on the type of the desired electrical storage device. For example, when producing a positive electrode of a lithium-ion secondary battery, it is preferable to use aluminum as the material for forming the positive electrode current collector 12. In this case, the thickness of the positive electrode current collector 12 is preferably 5 to 30 micrometers, and more preferably 8 to 25 micrometers.

The positive electrode active material layer 14 includes one positive electrode material, or two or more positive electrode materials, that can be doped/undoped with lithium as the positive electrode active material. The positive electrode active material layer 14 optionally includes a conductivity-imparting agent such as graphite. The positive electrode active material layer 14 may include a binder such as a fluorine atom-containing polymer (e.g., polyvinylidene fluoride or polyacrylic fluoride), a thickener used to disperse the positive electrode active material, or a polymer composition that includes a styrene-butadiene rubber (SBR) or a (meth)acrylate copolymer.

The positive electrode active material is not particularly limited as long as the positive electrode active material is a positive electrode material that can be doped/undoped with lithium, and includes a sufficient amount of lithium. It is preferable to use a complex metal oxide of lithium and a transition metal represented by $LiMO_2$ (wherein M includes at least one element among Co, Ni, Mn, Fe, Al, V, and Ti), an intercalation compound that includes lithium, or the like. It is also possible to use a compound represented by $Li_aMX_b$ (wherein M is an element selected from a transition metal, X is selected from S, Se, and $PO_4$, a is larger than 0, and b is an integer). It is particularly preferable to use a lithium complex oxide represented by $Li_xM_IO_2$ or $Li_yM_{II2}O_4$ as the positive electrode active material since a high voltage can be generated, and the energy density can be increased. Note that $M_I$ is one or more transition metal elements, and preferably at least one transition metal element selected from cobalt (Co) and nickel (Ni). $M_{II}$ is one or more transition metal elements, and preferably manganese (Mn). x and y differ depending on the battery charge-discharge state. x and y are normally within the range of 0.05 to 1.10. Specific examples of the lithium complex oxide include $LiCoO_2$, $LiNiO_2$, $LiNi_zCo_{1-z}O_2$ (wherein 0<z<1), $LiMn_2O_4$, and the like.

A metal foil, an etched metal foil, an expanded metal, or the like may be used as the negative electrode current collector 22. Specific examples of a material for forming the negative electrode current collector 22 include a metal such as aluminum, copper, nickel, tantalum, stainless steel, and titanium. An appropriate material may be selected depending on the type of the desired electrical storage device. It is preferable to use copper as the material for forming the negative electrode current collector 22. In this case, the thickness of the current collector is preferably 5 to 30 micrometers, and more preferably 8 to 25 micrometers.

The negative electrode active material layer 24 includes one negative electrode material, or two or more negative electrode materials, that can be doped/undoped with lithium as the negative electrode active material. The negative electrode active material layer 24 optionally includes a binder similar to that used for the positive electrode.

A carbon material, a crystalline or non-crystalline metal oxide, or the like may preferably be used as the negative electrode active material. Examples of the carbon material include non-graphitizable carbon materials such as coke and glassy carbon, graphite such as a highly crystalline carbon material having a highly developed crystalline structure, and the like. Specific examples of the carbon material include pyrolytic carbon, coke (e.g., pitch coke, needle coke, and petroleum coke), graphite, glassy carbon, a polymer compound calcined product (i.e., a product obtained by calcining and carbonizing a phenol resin, a furan resin, or the like at an appropriate temperature), carbon fibers, activated carbon, and the like. Examples of the crystalline or non-crystalline metal oxide include a crystalline or non-crystalline metal oxide that includes magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), or platinum (Pt). It is particularly preferable to use a crystalline or non-crystalline metal oxide that includes silicon (Si) or tin (Sn).

It is preferable to press the active material layer. Examples of a pressing means include a roll press, a high-pressure super press, a soft calendar, a 1-ton press, and the like. The pressing conditions are appropriately set depending on the type of press, and the desired thickness and density of the active material layer. When producing a positive electrode of a lithium-ion secondary battery, it is preferable that the active material layer have a thickness of 40 to 100 micrometers and a density of 2.0 to 5.0 $g/cm^3$. When producing a negative electrode of a lithium-ion secondary battery, it is preferable that the active material layer have a thickness of 40 to 100 micrometers and a density of 1.3 to 1.9 $g/cm^3$.

The protective film 30 is placed between the positive electrode 10 and the negative electrode 20. In the electrical storage device 1 illustrated in FIG. 1, the protective film 30 is placed between the positive electrode 10 and the negative electrode 20 so as to come in contact with the positive electrode active material layer 14. Note that the protective film 30 may be placed between the positive electrode 10 and the negative electrode 20 so as to come in contact with the negative electrode active material layer 24. The protective film 30 may be placed between the positive electrode 10 and the negative electrode 20 so as not to come in contact with the positive electrode 10 and the negative electrode 20. A short circuit does not occur due to the presence of the protective film 30 even if dendrites are precipitated during repeated charge and discharge. This makes it possible to maintain the functions of the electrical storage device.

The protective film 30 may be formed by applying the protective film-forming composition to the surface of the positive electrode 10 (or the negative electrode 20) to form a film, and drying the film. The protective film-forming composition may be applied to the surface of the positive electrode 10 (or the negative electrode 20) using a doctor blade method, a reverse roll method, a comma bar method, a gravure method, an air knife method, a die coating method, or the like. The film is preferably dried at 20 to 250° C. (more preferably 50 to 150° C.) for 1 to 120 minutes (more preferably 5 to 60 minutes).

The thickness of the protective film 30 is not particularly limited, but is preferably 0.5 to 4 micrometers, and more preferably 0.5 to 3 micrometers. When the thickness of the protective film 30 is within the above range, it is possible to implement an excellent electrolyte solution permeability-retention capability, and suppress an increase in internal resistance.

The electrolyte solution 40 is appropriately selected depending on the type of the desired electrical storage device. A solution prepared by dissolving an appropriate electrolyte in a solvent is used as the electrolyte solution 40.

When producing a lithium-ion secondary battery, a lithium compound is used as the electrolyte. Specific examples of the lithium compound include $LiClO_4$, $LiBF_4$, LiI, $LiPF_6$, $LiCF_3SO_3$, $LiAsF_6$, $LiSbF_6$, $LiAlCl_4$, LiCl, LiBr, $LiB(C_2H_5)_4$, $LiCH_3SO_3$, $LiC_4F_9SO_3$, $Li(CF_3SO_2)_2N$, and the like. In this case, the concentration of the electrolyte is preferably 0.5 to 3.0 mol/L, and more preferably 0.7 to 2.0 mol/L.

The type and the concentration of the electrolyte when producing a lithium-ion capacitor are the same as those when producing a lithium-ion secondary battery.

Examples of the solvent used to prepare the electrolyte solution include carbonates such as propylene carbonate, ethylene carbonate, butylene carbonate, dimethyl carbonate, diethyl carbonate, and methylethyl carbonate; lactones such as gamma-butyrolactone; ethers such as trimethoxysilane, 1,2-dimethoxyethane, diethyl ether, 2-ethoxyethane, tetrahydrofuran, and 2-methyltetrahydrofuran; sulfoxides such as dimethyl sulfoxide; oxolane derivatives such as 1,3-dioxolane and 4-methyl-1,3-dioxolane; nitrogen-containing compounds such as acetonitrile and nitromethane; esters such as methyl formate, methyl acetate, butyl acetate, methyl propionate, ethyl propionate, and phosphoric acid triester; glyme compounds such as diglyme, triglyme, and tetraglyme; ketones such as acetone, diethyl ketone, methyl ethyl ketone, and methyl isobutyl ketone; sulfone compounds such as sulfolane; oxazolidinone derivatives such as 2-methyl-2-oxazolidinone; sultone compounds such as 1,3-propanesultone, 1,4-butanesultone, 2,4-butanesultone, and 1,8-naphthosultone; and the like.

2.2 Second Embodiment

Figure 2:
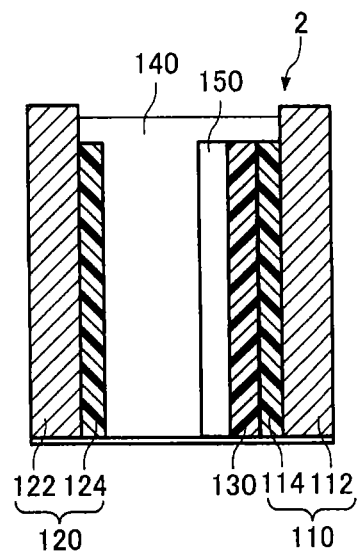
FIG. 2 is a schematic view illustrating the cross section of an electrical storage device according to a second embodiment.

FIG. 2 is a schematic view illustrating the cross section of an electrical storage device according to the second embodiment. As illustrated in FIG. 2, an electrical storage device 2 includes a positive electrode 110 that is formed by forming a positive electrode active material layer 114 on the surface of a positive electrode current collector 112, a negative electrode 120 that is formed by forming a negative electrode active material layer 124 on the surface of a negative electrode current collector 122, a protective film 130 that is provided between the positive electrode 110 and the negative electrode 120, an electrolyte solution 140 with which the space between the positive electrode 110 and the negative electrode 120 is filled, and a separator 150 that is provided between the positive electrode 110 and the negative electrode 120.

The electrical storage device 2 differs from the electrical storage device 1 in that the protective film 130 is provided so as to be held between the positive electrode 110 and the separator 150. Although the electrical storage device 2 illustrated in FIG. 2 has a configuration in which the protective film 130 is provided so as to be held between the positive electrode 110 and the separator 150, the protective film 130 may be provided so as to be held between the negative electrode 120 and the separator 150. According to the above configuration, a short circuit does not occur due to the presence of the protective film 130 even if a dendrite is precipitated during repeated charge and discharge. This makes it possible to maintain the functions of the electrical storage device.

The protective film 130 may be formed by applying the protective film-forming composition to the surface of the separator 150 to form a film, bonding the separator 150 to the positive electrode 110 (or the negative electrode 120), and drying the film. The protective film-forming composition may be applied to the surface of the separator 150 using a doctor blade method, a reverse roll method, a comma bar method, a gravure method, an air knife method, a die coating method, or the like. The film is preferably dried at 20 to 250° C. (more preferably 50 to 150° C.) for 1 to 120 minutes (more preferably 5 to 60 minutes).

The separator 150 is not particularly limited as long as the separator 150 is electrically stable, is chemically stable to the positive electrode active material, the negative electrode active material, and/or the solvent, and does not have electrical conductivity. For example, a polymer nonwoven fabric, a porous film, or a sheet formed using glass or ceramic fibers may be used as the separator 150. A laminate of these materials may also be used as the separator 150. It is particularly preferable to use a porous polyolefin film as the separator 150. A composite of a porous polyolefin film and a heat-resistant material formed of polyimide, glass, or ceramic fibers may also be used as the separator 150.

The electrical storage device 2 according to the second embodiment is configured in the same manner as the electrical storage device 1 according to the first embodiment (see FIG. 1), except for the above features. Therefore, further description thereof is omitted.

2.3 Third Embodiment

Figure 3:
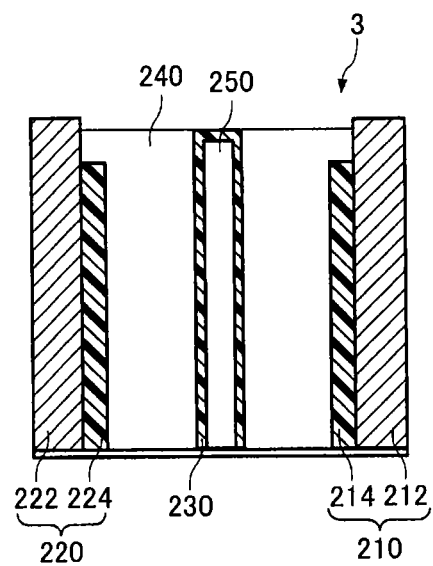
FIG. 3 is a schematic view illustrating the cross section of an electrical storage device according to a third embodiment.

FIG. 3 is a schematic view illustrating the cross section of an electrical storage device according to the third embodiment. As illustrated in FIG. 3, an electrical storage device 3 includes a positive electrode 210 that is formed by forming a positive electrode active material layer 214 on the surface of a positive electrode current collector 212, a negative electrode 220 that is formed by forming a negative electrode active material layer 224 on the surface of a negative electrode current collector 222, an electrolyte solution 240 with which the space between the positive electrode 210 and the negative electrode 220 is filled, a separator 250 that is provided between the positive electrode 210 and the negative electrode 220, and a protective film 230 that is provided to cover the surface of the separator 250.

The electrical storage device 3 differs from the electrical storage device 1 and the electrical storage device 2 in that the protective film 230 is provided to cover the surface of the separator 250. According to this configuration, a short circuit does not occur due to the presence of the protective film 230 even if dendrites are precipitated during repeated charge and discharge. This makes it possible to maintain the functions of the electrical storage device.

The protective film 230 may be formed by applying the protective film-forming composition to the surface of the separator 250 to form a film, and drying the film. The protective film-forming composition may be applied to the surface of the separator 250 using a doctor blade method, a reverse roll method, a comma bar method, a gravure method, an air knife method, a die coating method, or the like. The film is preferably dried at 20 to 250° C. (more preferably 50 to 150° C.) for 1 to 120 minutes (more preferably 5 to 60 minutes).

The electrical storage device 3 according to the third embodiment is configured in the same manner as the electrical storage device 1 according to the first embodiment (see FIG. 1) and the electrical storage device 2 according to the second embodiment (see FIG. 2), except for the above features. Therefore, further description thereof is omitted.

2.4. Production Method

The above electrical storage device may be produced by placing two electrodes (positive electrode and negative electrode, or two capacitor electrodes) opposite to each other optionally with a separator interposed therebetween to form a laminate, rolling or folding the laminate in the shape of a battery, placing the laminate in a battery casing, injecting an electrolyte solution into the battery casing, and sealing the battery casing, for example. The battery may have an arbitrary shape (e.g., coin, button, sheet, cylinder, square, or flat shape).

2.5. Application

The above electrical storage device may suitably be used as a secondary battery or a capacitor mounted on an automobile (e.g., electric vehicle, hybrid car, or truck), and may also suitably be used as a secondary battery or a capacitor used for AV equipment, OA equipment, communication equipment, and the like.

3. Examples

The invention is further described below by way of examples. Note that the invention is not limited to the following examples. Note that the unit "parts" used in the examples and comparative examples refers to "parts by mass", and the unit "%" used in the examples and comparative examples refers to "mass %", unless otherwise specified.

3.1. Synthesis of Polymer Particles (A1)

3.1.1. Synthesis Example 1

<Synthesis of Polymer X>

An autoclave (internal volume: 6 L) equipped with an electromagnetic stirrer, in which the internal atmosphere had been sufficiently replaced with nitrogen, was charged with 2.5 L of deoxidized purified water and 25 g of ammonium perfluorodecanoate (emulsifier). The mixture was heated to 60° C. with stirring at 350 rpm. The autoclave was then charged with a gas mixture of vinylidene fluoride (VDF) (70%) and hexafluoropropylene (HFP) (30%) until the internal pressure reached 20 kg/cm$^2$. 25 g of a CFC-113 solution including 20% of diisopropyl peroxydicarbonate (initiator) was injected into the autoclave using nitrogen gas to initiate polymerization. The internal pressure was maintained at 20 kg/cm$^2$ during polymerization by successively injecting a gas mixture of VDF (60.2%) and HFP (39.8%). Since the polymerization rate decreased along with the progress of polymerization, 25 g of a CFC-113 solution including 20% of diisopropyl peroxydicarbonate was again injected using nitrogen gas when 3 hours had elapsed, and the monomers were polymerized for a further 3 hours. The reaction mixture was cooled without stirring, and the reaction was terminated after removing unreacted monomers to obtain an aqueous dispersion including particles of a polymer X (content: 40%). The mass ratio (VDF/HFP) of VDF to HFP in the polymer X determined by $^{19}$F-NMR analysis was 21/4.

<Synthesis of Polymer Particles (A1)>

A 7 L separable flask in which the internal atmosphere had been sufficiently replaced with nitrogen, was charged with 25 parts by mass (on a basis of the polymer X) of the aqueous dispersion including the particles of the polymer X, 0.5 parts by mass of Adeka Reasoap SR1025 (manufactured by Adeka Corporation) (emulsifier), 30 parts by mass of methyl methacrylate (MMA), 40 parts by mass of 2-ethylhexyl acrylate (EHA), 5 parts by mass of methacrylic acid (MAA), and 130 parts by mass of water. The mixture was stirred at 70° C. for 3 hours to allow the monomers to be absorbed by the polymer X. After the addition of 20 mL of a tetrahydrofuran solution including 0.5 parts by mass of azobisisobutyronitrile (oil-soluble initiator), the mixture was reacted at 75° C. for 3 hours, and then reacted at 85° C. for 2 hours. After cooling the mixture to terminate the reaction, the pH of the mixture was adjusted to 7 using a 2.5 N sodium hydroxide aqueous solution to obtain an aqueous dispersion S1 including polymer particles (A1) including the polymer X and a polymer Y (content: 40%).

The particle size distribution in the aqueous dispersion S1 was measured using a particle size distribution analyzer that utilizes a dynamic light scattering method as a measurement principle ("FPAR-1000" manufactured by Otsuka Electronics Co., Ltd.), and the number average particle size (Da1) was calculated from the particle size distribution. The number average particle size (Da1) thus calculated was 330 nm.

10 g of the aqueous dispersion S1 was weighed on a Teflon (registered trademark) petri dish (diameter: 8 cm), and dried at 120° C. for 1 hour to form a film. 1 g of the resulting film (polymer) was immersed in 400 mL of toluene, followed by shaking at 50° C. for 3 hours. After filtering the toluene phase through a wire gauze (300 mesh) to separate insoluble components, toluene included in the filtrate was evaporated off, and the weight (Y (g)) of the residue was measured. The toluene insoluble content was calculated using the following expression (1). The toluene insoluble content in the polymer particles (A1) thus calculated was 85%.

Toluene insoluble content (%)=((1−Y)/1)×100  (1)

The film (i.e., a film formed of the polymer particles (A1)) was subjected to differential scanning calorimetry using a differential scanning calorimeter ("DSC204F1 Phoenix" manufactured by NETZSCH). Since the melting temperature (Tm) was not observed, and a single glass transition temperature (Tg) was observed at −5° C., it is considered that the polymer particles (A1) were polymer alloy particles.

The film (polymer) was subjected to thermogravimetry using a thermal analyzer ("DTG-60A" manufactured by Shimadzu Corporation). A temperature at which the polymer particles (A1) had decreased in weight by 10 wt % in an air atmosphere when heated at a temperature increase rate of 20° C./min (hereinafter referred to as "weight loss start temperature $T_{10}$") was 338° C.

3.1.2. Synthesis Examples 2 to 12 and 31

Figure 4:
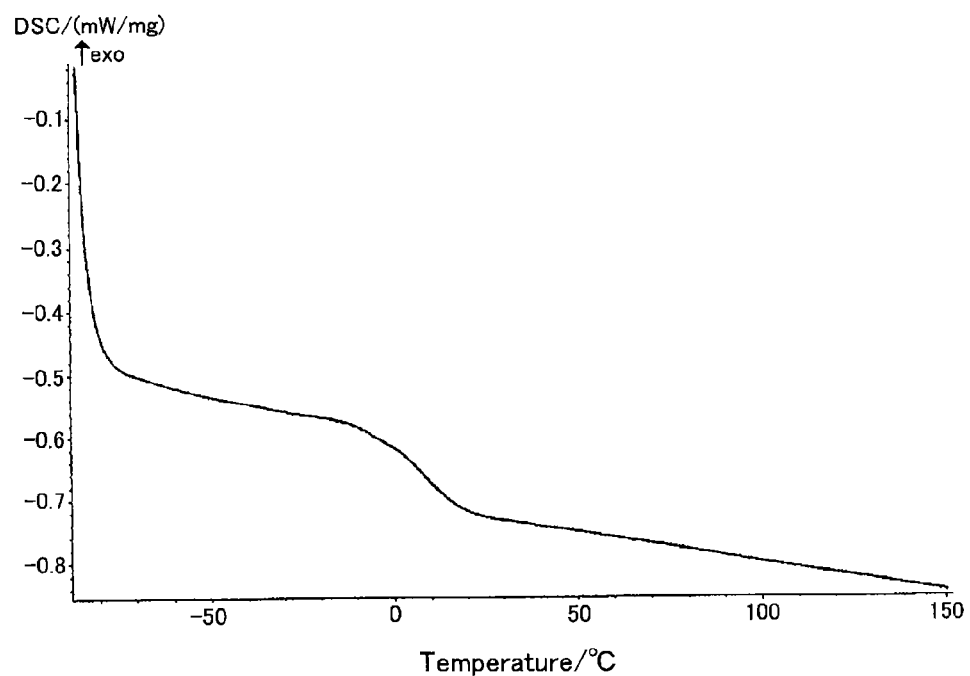
FIG. 4 shows the DSC chart of the polymer particles (A1) obtained in Synthesis Example 3.

An aqueous dispersion including polymer particles (A1) having the composition shown in Table 1 was prepared in the same manner as in Synthesis Example 1, except that the composition of the monomer gas and the amount of the emulsifier were appropriately changed. Water was removed from the aqueous dispersion under reduced pressure, or added to the aqueous dispersion, depending on the solid content in the aqueous dispersion to obtain aqueous dispersions S2 to S12 and S15 having a solid content of 40%. The resulting polymer particles (A1) were subjected to toluene insoluble content measurement, DSC measurement (glass transition temperature (Tg) and melting temperature (Tm)), and TG measurement (weight loss start temperature $T_{10}$) in the same manner as in Synthesis Example 1. The results are shown in Table 1. FIG. 4 shows the DSC chart of the polymer particles (A1) obtained in Synthesis Example 3. As shown in FIG. 4, since the melting temperature (Tm) was not observed, and a single glass transition temperature (Tg) was observed at −15° C., it is considered that the polymer particles (A1) obtained in Synthesis Example 3 were polymer alloy particles.

3.1.3. Synthesis Example 13

An aqueous dispersion including polymer particles (A1) having the composition shown in Table 1 was prepared in the same manner as in Synthesis Example 1, except that the polymer X was not used. Water was removed from the aqueous dispersion under reduced pressure, or added to the aqueous dispersion, depending on the solid content in the aqueous dispersion to obtain an aqueous dispersion S13 having a solid content of 40%. The resulting polymer particles (A1) were subjected to toluene insoluble content measurement, DSC measurement (glass transition temperature (Tg) and melting temperature (Tm)), and TG measurement (weight loss start temperature $T_{10}$) in the same manner as in Synthesis Example 1. The results are shown in Table 1.

3.1.4. Synthesis Example 14

A temperature-adjustable autoclave equipped with a stirrer was charged with 200 parts by mass of water, 0.6 parts by mass of sodium dodecylbenzenesulfonate, 1.0 part by mass of potassium persulfate, 0.5 parts by mass of sodium hydrogen sulfite, 0.5 parts by mass of an alpha-methylstyrene dimer, 0.3 parts by mass of dodecylmercaptan, and the monomers shown in Table 1 (see "Polymer (A1)"). The mixture was heated to 70° C. to effect polymerization for 8 hours. The mixture was then heated to 80° C., and reacted for 3 hours to obtain a latex. After adjusting the pH of the latex to 7.5, 5 parts by mass (on a solid basis) of potassium tripolyphosphate (10 mass % aqueous solution) was added to the latex. The residual monomers were removed by steam distillation, and the residue was concentrated under reduced pressure to obtain an aqueous dispersion S14 including polymer particles (A1) (content: 50 mass %). The resulting polymer particles (A1) were subjected to toluene insoluble content measurement, DSC measurement (glass transition temperature (Tg) and melting temperature (Tm)), and TG measurement (weight loss start temperature $T_{10}$) in the same manner as in Synthesis Example 1. The results are shown in Table 1.

3.2. Synthesis of Polymer Particles (A2)

3.2.1. Synthesis Example 15

A 2 L flask was charged with 100 parts by mass of styrene, 10 parts by mass of t-dodecylmercaptan, 0.8 parts by mass of sodium dodecylbenzenesulfonate, 0.4 parts by mass of potassium persulfate, and 200 parts by mass of water. The mixture was heated to 80° C. with stirring in a nitrogen gas atmosphere to effect polymerization for 6 hours. An aqueous dispersion including polymer particles having a number average particle size of 170 nm and a particle size standard deviation of 0.02 micrometers was thus obtained (polymerization yield: 98%). The toluene soluble content in the polymer particles was 98%, and the weight average molecular weight (Mw) and the number average molecular weight (Mn) of the polymer particles determined by gel permeation chromatography were 5000 and 3100, respectively.

A reactor in which the internal atmosphere had been sufficiently replaced with nitrogen, was charged with the aqueous dispersion including the polymer particles obtained by the above step (polymer particles: 5 parts by mass (on a solid basis)), 1.0 part by mass of sodium lauryl sulfate, 0.5 parts by mass of potassium persulfate, 400 parts by mass of water, 45 parts by mass of styrene, and 50 parts by mass of divinylbenzene. The mixture was stirred at 30° C. for 10 minutes to allow the monomers to be absorbed by the polymer particles. The mixture was heated to 70° C., and reacted for 3 hours. After cooling the mixture to terminate the reaction, the pH of the mixture was adjusted to 7 using a 2.5 N sodium hydroxide aqueous solution to obtain an aqueous dispersion L1 including polymer particles (A2) (content: 20%).

The particle size distribution in the aqueous dispersion L1 was measured using a particle size distribution analyzer that utilizes a dynamic light scattering method as a measurement principle ("FPAR-1000" manufactured by Otsuka Electronics Co., Ltd.), and the number average particle size (Da2) of the polymer particles (A2) was calculated from the particle size distribution. The number average particle size (Da2) of the polymer particles (A2) thus calculated was 380 nm.

100 g of the aqueous dispersion including the polymer particles (A2) was weighed on a petri dish, and dried at 120° C. for 1 hour. The resulting solid was ground using an agate mortar to obtain a powder (polymer particles (A2)).

Figure 5:
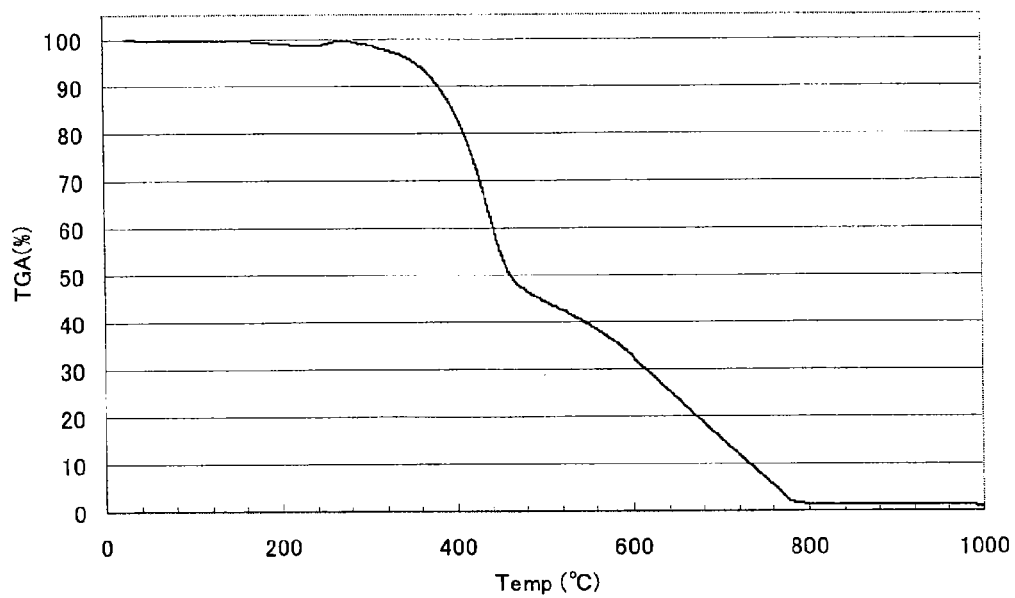
FIG. 5 shows the TGA chart of the polymer particles (A2) obtained in Synthesis Example 15.

The powder (i.e., a powder formed of the polymer particles (A2)) was subjected to toluene insoluble content measurement, DSC measurement, and TG measurement in the same manner as in Synthesis Example 1. The toluene insoluble content thus measured was 99%, the glass transition temperature (Tg) and the melting temperature (Tm) were not observed, and the weight loss start temperature $T_{10}$ was 379° C. FIG. 5 shows the TGA chart of the polymer particles (A2) obtained in Synthesis Example 15. FIG. 5 shows that the temperature ($T_{10}$) at which the polymer particles (A2) obtained in Synthesis Example 15 had decreased in weight by 10 wt % in an air atmosphere was 379° C.

3.2.2. Synthesis Examples 16 to 25

An aqueous dispersion including polymer particles (A2) having the composition shown in Table 2 was prepared in the same manner as in Synthesis Example 15, except that the composition and the amount of the emulsifier were appropriately changed. Water was removed from the aqueous dispersion under reduced pressure, or added to the aqueous dispersion, depending on the solid content in the aqueous dispersion to obtain aqueous dispersions L2 to L11 having a solid content of 20%. The resulting polymer particles (A2) were subjected to toluene insoluble content measurement, DSC measurement (glass transition temperature (Tg) and melting temperature (Tm)), and TG measurement (weight loss start temperature $T_{10}$) in the same manner as in Synthesis Example 1. The results are shown in Table 2.

3.2.3 Synthesis Example 26

A 2 L high-pressure reaction vessel equipped with a stirrer and a temperature controller was charged with 109.5 parts by mass of water, 0.2 parts by mass of sodium dodecylbenzenesulfonate (emulsifier), 0.5 parts by mass of octyl glycol (molecular weight modifier), and 0.5 parts by mass of sodium persulfate (initiator). Next, 20% of a monomer mixture prepared by mixing 20 parts by mass of methacrylic acid and 80 parts by mass of methyl methacrylate was added to the high-pressure reaction vessel. After heating the high-pressure reaction vessel to 75° C. while stirring the mixture, a polymerization reaction was effected for 1 hour, and the remainder of the monomer mixture was continuously added to the high-pressure reaction vessel over 2 hours while maintaining the temperature of the high-pressure reaction vessel at 75° C. The mixture was then aged for 2 hours to obtain an aqueous dispersion (solid content: 40%) including polymer particles (A2a) having a number average particle size of 200 nm.

A 2 L high-pressure reaction vessel equipped with a stirrer and a temperature controller was charged with 186 parts by mass of water. After the addition of 10 parts by mass (on a solid basis) of the polymer particles (A2a) having a number average particle size of 200 nm and 0.5 parts by mass of sodium persulfate (initiator), the high-pressure reaction vessel was heated to 80° C. while stirring the mixture. A monomer mixture prepared by mixing 30 parts by mass of methacrylic acid, 69.5 parts by mass of methyl methacrylate, and 0.5 parts by mass of divinylbenzene was continuously added to the high-pressure reaction vessel over 3 hours with stirring while maintaining the temperature of the high-pressure reaction vessel at 80° C. The mixture was then aged for 2 hours to obtain an aqueous dispersion (solid content: 31%) including polymer particles (A2b) having a number average particle size of 400 nm.

A 2 L high-pressure reaction vessel equipped with a stirrer and a temperature controller was charged with 350 parts by mass of water. After the addition of 15 parts by mass (on a solid basis) of the polymer particles (A2b) having a number average particle size of 400 nm and 0.4 parts by mass of sodium persulfate (initiator), the high-pressure reaction vessel was heated to 80° C. while stirring the mixture. A monomer mixture prepared by mixing 50 parts by mass of styrene, 25 parts by mass of divinylbenzene, and 25 parts by mass of ethylvinylbenzene was continuously added to the high-pressure reaction vessel over 4 hours with stirring. The temperature of the high-pressure reaction vessel was maintained at 80° C. while the monomer mixture was added to the high-pressure reaction vessel. After completion of continuous addition of the monomer mixture, 5 parts by mass of 25% aqueous ammonia was added to the high-pressure reaction vessel maintained at 80° C., and the mixture was aged for 3 hours to obtain an aqueous dispersion L12 including polymer particles (A2) (content: 20%).

The resulting polymer particles (A2) were subjected to toluene insoluble content measurement, DSC measurement (glass transition temperature (Tg) and melting temperature (Tm)), and TG measurement (weight loss start temperature $T_{10}$) in the same manner as in Synthesis Example 1. The results are shown in Table 2.

The particle size distribution in the aqueous dispersion L12 was measured using a particle size distribution analyzer that utilizes a dynamic light scattering method as a measurement principle ("FPAR-1000" manufactured by Otsuka Electronics Co., Ltd.), and the number average particle size (Da2) of the polymer particles (A2) was calculated from the particle size distribution. The number average particle size (Da2) of the polymer particles (A2) thus calculated was 1000 nm.

In order to further analyze the structure of the particles, the aqueous dispersion including the polymer particles (A2) (content: 20%) was dried (solidified), washed three times with a 20-fold amount (on a solid basis) of aqueous ammonia (pH: 10), washed four times with ion-exchanged water to completely remove a water-soluble component, and dried (solidified) to obtain a powder of the polymer particles (A2). The powder was observed using a transmission electron microscope ("H-7650" manufactured by Hitachi, Ltd.). It was found that the polymer particles (A2) were hollow polymer particles (one hundred particles thus observed had an average particle size of 1000 nm and an inner diameter of 600 nm), and the volume porosity was 22%.

3.2.4. Synthesis Example 27

An aqueous dispersion L13 including polymer particles (A2) (content: 20%) was obtained in the same manner as in Synthesis Example 26, except that 50 parts by mass (on a solid basis) of the polymer particles (A2b), 77 parts by mass of styrene, 22 parts by mass of divinylbenzene, and 1 part by mass of acrylic acid were used instead of 15 parts by mass (on a solid basis) of the polymer particles (A2b), 50 parts by mass of styrene, 25 parts by mass of divinylbenzene, and 25 parts by mass of ethylvinylbenzene.

The resulting polymer particles (A2) were subjected to toluene insoluble content measurement, DSC measurement (glass transition temperature (Tg) and melting temperature (Tm)), and TG measurement (weight loss start temperature $T_{10}$) in the same manner as in Synthesis Example 1. The results are shown in Table 2.

The particle size distribution in the aqueous dispersion L13 was measured using a particle size distribution analyzer that utilizes a dynamic light scattering method as a measurement principle ("FPAR-1000" manufactured by Otsuka Electronics Co., Ltd.), and the number average particle size (Da2) of the polymer particles (A2) was calculated from the particle size distribution. The number average particle size (Da2) of the polymer particles (A2) thus calculated was 810 nm.

In order to further analyze the structure of the particles, the aqueous dispersion including the polymer particles (A2) (content: 20%) was dried (solidified), washed three times with a 20-fold amount (on a solid basis) of aqueous ammonia (pH: 10), washed four times with ion-exchanged water to completely remove a water-soluble component, and dried (solidified) to obtain a powder of the polymer particles (A2). The powder was observed using a transmission electron microscope ("H-7650" manufactured by Hitachi, Ltd.). It was found that the polymer particles (A2) were hollow polymer particles (one hundred particles thus observed had an average particle size of 810 nm and an inner diameter of 700 nm), and the volume porosity was 65%.

3.2.5. Synthesis Example 28

A 2 L high-pressure reaction vessel equipped with a stirrer and a temperature controller was charged with 99 parts by mass of styrene, 1 part by mass of methacrylic acid, 8 parts by mass of t-dodecylmercaptan, and an aqueous solution prepared by dissolving 0.4 parts by mass of sodium lauryl sulfate and 1.0 part by mass of potassium persulfate in 200 parts by mass of water. The monomers were polymerized at 70° C. for 8 hours with stirring to obtain an aqueous dispersion including polymer particles having a number average particle size of 250 nm.

10 parts by mass (on a solid basis) of the polymer particles, 0.1 parts by mass of polyoxyethylene nonyl phenyl ether, 0.3 parts by mass of sodium lauryl sulfate, and 0.5 parts by mass of potassium persulfate were dispersed in 900 parts by mass of water. After the addition of a mixture of 60 parts by mass of methyl methacrylate, 30 parts by mass of divinylbenzene, 10 parts by mass of styrene, and 20 parts by mass of toluene to the dispersion, the mixture was stirred at 30° C. for 1 hour, stirred at 70° C. for 5 hours, cooled, and subjected to steam stripping to obtain an aqueous dispersion L14 including hollow polymer particles (A2).

The resulting polymer particles (A2) were subjected to toluene insoluble content measurement, DSC measurement (glass transition temperature (Tg) and melting temperature (Tm)), and TG measurement (weight loss start temperature $T_{10}$) in the same manner as in Synthesis Example 1. The results are shown in Table 2.

The particle size distribution in the aqueous dispersion L14 was measured using a particle size distribution analyzer that utilizes a dynamic light scattering method as a measurement principle ("FPAR-1000" manufactured by Otsuka Electronics Co., Ltd.), and the number average particle size (Da2) of the polymer particles (A2) was calculated from the particle size distribution. The number average particle size (Da2) of the polymer particles (A2) thus calculated was 490 nm. The polymer particles (A2) were dried, and observed using a transmission electron microscope ("H-7650" manufactured by Hitachi, Ltd.). It was found that the polymer particles (A2) were hollow polymer particles (one hundred particles thus observed had an average particle size of 490 nm and an inner diameter of 350 nm), and the volume porosity was 36%.

3.2.6 Synthesis Example 29

An aqueous dispersion L15 including polymer particles (A2) was obtained in the same manner as in Synthesis Example 28, except that 60 parts by mass of methyl methacrylate, 40 parts by mass of allyl methacrylate, and 15 parts by mass of toluene were used instead of 60 parts by mass of methyl methacrylate, 30 parts by mass of divinylbenzene, 10 parts by mass of styrene, and 20 parts by mass of toluene.

The resulting polymer particles (A2) were subjected to toluene insoluble content measurement, DSC measurement (glass transition temperature (Tg) and melting temperature (Tm)), and TG measurement (weight loss start temperature $T_{10}$) in the same manner as in Synthesis Example 1. The results are shown in Table 2.

The particle size distribution in the aqueous dispersion L15 was measured using a particle size distribution analyzer that utilizes a dynamic light scattering method as a measurement principle ("FPAR-1000" manufactured by Otsuka Electronics Co., Ltd.), and the number average particle size (Da2) of the polymer particles (A2) was calculated from the particle size distribution. The number average particle size (Da2) of the polymer particles (A2) thus calculated was 420 nm. The polymer particles (A2) were dried, and observed using a transmission electron microscope ("H-7650" manufactured by Hitachi, Ltd.). It was found that the polymer particles (A2) were hollow polymer particles (one hundred particles thus observed had an average particle size of 420 nm and an inner diameter of 220 nm), and the volume porosity was 14%.

3.2.7. Synthesis Example 30

A 2 L high-pressure reaction vessel equipped with a stirrer and a temperature controller was charged with 109.5 parts by mass of water, 0.2 parts by mass of sodium dodecylbenzenesulfonate (emulsifier), 0.5 parts by mass of octyl glycol (molecular weight modifier), and 0.5 parts by mass of sodium persulfate (initiator). Next, 20% of a monomer mixture prepared by mixing 15 parts by mass of methacrylic acid and 85 parts by mass of methyl methacrylate was added to the high-pressure reaction vessel. After heating the high-pressure reaction vessel to 75° C. while stirring the mixture, a polymerization reaction was effected for 1 hour, and the remainder of the monomer mixture was continuously added to the high-pressure reaction vessel over 2 hours while maintaining the temperature of the high-pressure reaction vessel at 75° C. The mixture was then aged for 2 hours to obtain an aqueous dispersion (solid content: 40%) including polymer particles having a number average particle size of 200 nm.

A 2 L high-pressure reaction vessel equipped with a stirrer and a temperature controller was charged with 186 parts by mass of water. After the addition of 10 parts by mass (on a solid basis) of the polymer particles having a number average particle size of 200 nm and 0.5 parts by mass of sodium persulfate (initiator), the high-pressure reaction vessel was heated to 80° C. while stirring the mixture. A monomer mixture prepared by mixing 30 parts by mass of methacrylic acid, 69.5 parts by mass of methyl methacrylate, and 0.5 parts by mass of divinylbenzene was continuously added to the high-pressure reaction vessel over 3 hours with stirring while maintaining the temperature of the high-pressure reaction vessel at 80° C. The mixture was then aged for 2 hours to obtain an aqueous dispersion (solid content: 31%) including polymer particles having a number average particle size of 400 nm.

A 2 L high-pressure reaction vessel equipped with a stirrer and a temperature controller was charged with 350 parts by mass of water. After the addition of 20 parts by mass (on a solid basis) of the polymer particles having a number average particle size of 400 nm and 0.4 parts by mass of sodium persulfate (initiator), the high-pressure reaction vessel was heated to 80° C. while stirring the mixture. A monomer mixture prepared by mixing 90 parts by mass of styrene, 9 parts by mass of divinylbenzene, and 1 part by mass of acrylic acid was continuously added to the high-pressure reaction vessel over 4 hours with stirring. The temperature of the high-pressure reaction vessel was maintained at 80° C. while the monomer mixture was added to the high-pressure reaction vessel. After completion of continuous addition of the monomer mixture, 5 parts by mass of 25% aqueous ammonia was added to the high-pressure reaction vessel maintained at 80° C., and the mixture was aged for 3 hours to obtain an aqueous dispersion L16 including polymer particles (A2) (content: 20%).

The resulting polymer particles (A2) were subjected to toluene insoluble content measurement, DSC measurement (glass transition temperature (Tg) and melting temperature (Tm)), and TG measurement (weight loss start temperature $T_{10}$) in the same manner as in Synthesis Example 1. The results are shown in Table 2.

The particle size distribution in the aqueous dispersion L16 was measured using a particle size distribution analyzer that utilizes a dynamic light scattering method as a measurement principle ("FPAR-1000" manufactured by Otsuka Electronics Co., Ltd.), and the number average particle size (Da2) of the polymer particles (A2) was calculated from the particle size distribution. The number average particle size (Da2) of the polymer particles (A2) thus calculated was 1000 nm.

In order to further analyze the structure of the particles, the aqueous dispersion including the polymer particles (A2) (content: 20%) was dried (solidified), washed three times with a 20-fold amount (on a solid basis) of aqueous ammonia (pH: 10), washed four times with ion-exchanged water to completely remove a water-soluble component, and dried (solidified) to obtain a powder of the polymer particles (A2). The powder was observed using a transmission electron microscope ("H-7650" manufactured by Hitachi, Ltd.). It was found that the polymer particles (A2) were hollow polymer particles (one hundred particles thus observed had an average particle size of 1000 nm and an inner diameter of 800 nm), and the volume porosity was 51%.

TABLE 1

| | | | | Synthesis Example 1 | Synthesis Example 2 | Synthesis Example 3 | Synthesis Example 4 | Synthesis Example 5 | Synthesis Example 6 | Synthesis Example 7 | Synthesis Example 8 |
|---|---|---|---|---|---|---|---|---|---|---|---|
| Aqueous dispersion of polymer particles (A1) | | | | S1 | S2 | S3 | S4 | S5 | S6 | S7 | S8 |
| Polymer particles (A1) | Polymer composition | Compound that includes two or more polymerizable unsaturated groups | AMA (parts by mass) | — | — | — | — | 2 | — | 2 | — |
| | | | EDMA (parts by mass) | — | — | — | — | — | — | — | 13 |
| | | | DVB (parts by mass) | — | — | — | — | — | — | — | — |
| | | Fluorine atom-containing monomer | VDF (parts by mass) | 21 | 19 | 21 | 21 | 42 | 4 | 42 | 4 |
| | | | HFP (parts by mass) | 4 | 3 | 4 | — | 8 | 1 | 8 | 1 |
| | | | TFE (parts by mass) | — | 3 | — | 4 | — | — | — | — |
| | | Unsaturated carboxylic acid | MAA (parts by mass) | 5 | 5 | — | 5 | — | — | 4 | — |
| | | | TA (parts by mass) | — | — | — | — | — | 4 | — | — |
| | | | AA (parts by mass) | — | — | 3 | — | 2 | 5 | — | 3 |

TABLE 1-continued

|  |  |  |  |  |  |  |  |  |  |  |
|---|---|---|---|---|---|---|---|---|---|---|
|  | Unsaturated carboxylic ester | MMA (parts by mass) | 30 | 20 | 10 | 30 | 10 | 21 | 20 | 5 |
|  |  | EHA (parts by mass) | 40 | 40 | 40 | 40 | 28 | 55 | 26 | 87 |
|  |  | BMA (parts by mass) | — | — | — | — | — | — | — | — |
|  |  | CHMA (parts by mass) | — | — | 10 | — | — | 10 | — | — |
|  | Aromatic vinyl compound | ST (parts by mass) | — | — | — | — | — | — | — | — |
|  | Conjugated diene compound | BD (parts by mass) | — | — | — | — | — | — | — | — |
|  | Nitrile compound | AN (parts by mass) | — | 10 | 10 | — | 10 | — | — | — |
| Particle size Da1 (nm) |  |  | 330 | 100 | 200 | 200 | 100 | 400 | 95 | 200 |
| Toluene insoluble content (%) |  |  | 85 | 92 | 97 | 93 | 86 | 95 | 87 | 97 |
| TG |  | $T_{10}$ (° C.) | 338 | 342 | 358 | 335 | 358 | 339 | 361 | 346 |
| DSC |  | Tg (° C.) | −5 | 0 | −15 | −8 | −5 | −12 | 4 | −35 |
|  |  | Tm (° C.) | Not observed | Not observed | Not observed | Not observed | Not observed | Not observed | Not observed | Not observed |

|  |  |  |  | Synthesis Example 9 | Synthesis Example 10 | Synthesis Example 11 | Synthesis Example 12 | Synthesis Example 13 | Synthesis Example 14 | Synthesis Example 31 |
|---|---|---|---|---|---|---|---|---|---|---|
| Aqueous dispersion of polymer particles (A1) |  |  |  | S9 | S10 | S11 | S12 | S13 | S14 | S15 |
| Polymer particles (A1) | Polymer composition | Compound that includes two or more polymerizable unsaturated groups | AMA (parts by mass) | — | — | — | — | — | — | — |
|  |  |  | EDMA (parts by mass) | — | — | — | — | 1 | — | — |
|  |  |  | DVB (parts by mass) | 16 | — | — | — | — | — | — |
|  | Fluorine atom-containing monomer |  | VDF (parts by mass) | 21 | 21 | 21 | 75 | — | — | 21 |
|  |  |  | HFP (parts by mass) | 4 | 4 | 4 | 5 | — | — | 4 |
|  |  |  | TFE (parts by mass) | — | — | — | — | — | — | — |
|  | Unsaturated carboxylic acid |  | MAA (parts by mass) | 5 | 5 | 5 | 5 | — | — | — |
|  |  |  | TA (parts by mass) | — | — | — | — | — | 2 | — |
|  |  |  | AA (parts by mass) | — | — | — | — | 3 | 2 | 5 |
|  | Unsaturated carboxylic ester |  | MMA (parts by mass) | 24 | 30 | 30 | 5 | — | 12 | 55 |
|  |  |  | EHA (parts by mass) | 40 | 40 | 40 | 10 | 33 | — | 15 |
|  |  |  | BMA (parts by mass) | — | — | — | — | 60 | — | — |
|  |  |  | CHMA (parts by mass) | — | — | — | — | — | — | — |
|  | Aromatic vinyl compound |  | ST (parts by mass) | — | — | — | — | — | 46 | — |
|  | Conjugated diene compound |  | BD (parts by mass) | — | — | — | — | — | 38 | — |

TABLE 1-continued

|  |  |  | | | | | | | |
|---|---|---|---|---|---|---|---|---|---|
| | Nitrile compound | AN (parts by mass) | — | — | — | — | — | — | — |
| Particle size Da1 (nm) | | | 210 | 200 | 100 | 100 | 180 | 180 | 250 |
| Toluene insoluble content (%) | | | 97 | 96 | 96 | 79 | 98 | 92 | 87 |
| TG | $T_{10}$ (° C.) | | 340 | 338 | 335 | 371 | 340 | 320 | 344 |
| DSC | Tg (° C.) | | Not observed | −5 | −5 | −15 | −10 | 2 | 55 |
| | Tm (° C.) | | Not observed | Not observed | Not observed | Not observed | Not observed | Not observed | Not observed |

TABLE 2

| | | | | Synthesis Example 15 | Synthesis Example 16 | Synthesis Example 17 | Synthesis Example 18 | Synthesis Example 19 | Synthesis Example 20 | Synthesis Example 21 | Synthesis Example 22 |
|---|---|---|---|---|---|---|---|---|---|---|---|
| Aqueous dispersion of polymer particles (A2) | | | | L1 | L2 | L3 | L4 | L5 | L6 | L7 | L8 |
| Polymer particles (A2) | Polymer composition | Compound that includes two or more polymerizable unsaturated groups | AMA (parts by mass) | — | — | — | — | — | — | — | — |
| | | | EDMA (parts by mass) | — | — | — | — | — | 25 | — | — |
| | | | DVB (parts by mass) | 50 | 20 | 95 | 50 | 50 | — | 25 | 8 |
| | | Unsaturated carboxylic ester | MMA (parts by mass) | — | — | — | — | — | 75 | — | 72 |
| | | Aromatic vinyl compound | ST (parts by mass) | 50 | 60 | 5 | 50 | 50 | — | 75 | 20 |
| | | | EVB (parts by mass) | — | 20 | — | — | — | — | — | — |
| | | Unsaturated carboxylic acid | AA (parts by mass) | — | — | — | — | — | — | — | — |
| | | Nitrile compound | AN (parts by mass) | — | — | — | — | — | — | — | — |
| Particle size Da2 (nm) | | | | 380 | 400 | 420 | 2700 | 120 | 340 | 380 | 380 |
| Toluene insoluble content (%) | | | | 99 | 94 | 100 | 99 | 99 | 99 | 100 | 97 |
| Volume porosity (%) | | | | ND | ND | ND | ND | ND | ND | ND | ND |
| TG | $T_{10}$ (° C.) | | | 379 | 340 | 422 | 379 | 379 | 395 | 360 | 295 |
| DSC | Tg (° C.) | | | Not observed | Not observed | Not observed | Not observed | Not observed | Not observed | Not observed | Not observed |
| | Tm (° C.) | | | Not observed | Not observed | Not observed | Not observed | Not observed | Not observed | Not observed | Not observed |

| | | | | Synthesis Example 23 | Synthesis Example 24 | Synthesis Example 25 | Synthesis Example 26 | Synthesis Example 27 | Synthesis Example 28 | Synthesis Example 29 | Synthesis Example 30 |
|---|---|---|---|---|---|---|---|---|---|---|---|
| Aqueous dispersion of polymer particles (A2) | | | | L9 | L10 | L11 | L12 | L13 | L14 | L15 | L16 |
| Polymer particles (A2) | Polymer composition | Compound that includes two or more polymerizable unsaturated groups | AMA (parts by mass) | — | — | — | — | — | — | 40 | — |
| | | | EDMA (parts by mass) | — | — | — | — | — | — | — | — |
| | | | DVB (parts by mass) | 5 | 15 | 15 | 25 | 22 | 30 | — | 9 |
| | | Unsaturated carboxylic ester | MMA (parts by mass) | 50 | — | 5 | — | — | 60 | 60 | — |
| | | Aromatic vinyl compound | ST (parts by mass) | 40 | 70 | — | 50 | 77 | 10 | — | 90 |
| | | | EVB (parts by mass) | 5 | 15 | — | 25 | — | — | — | — |

TABLE 2-continued

| | | | | | | | | | | |
|---|---|---|---|---|---|---|---|---|---|---|
| Unsaturated carboxylic acid | AA (parts by mass) | — | — | — | — | 1 | — | — | 1 |
| Nitrile compound | AN (parts by mass) | — | — | 80 | — | — | — | — | — |
| Particle size Da2 (nm) | | 90 | 3500 | 1200 | 1000 | 810 | 490 | 420 | 1000 |
| Toluene insoluble content (%) | | 89 | 95 | 99 | 99 | 98 | 96 | 96 | 99 |
| Volume porosity (%) | | ND | ND | ND | 22 | 65 | 36 | 14 | 51 |
| TG | $T_{10}$ (° C.) | 325 | 325 | 380 | 355 | 360 | 365 | 372 | 350 |
| DSC | Tg (° C.) | Not observed | Not observed | Not observed | Not observed | Not observed | Not observed | Not observed | Not observed |
| | Tm (° C.) | Not observed | Not observed | Not observed | Not observed | Not observed | Not observed | Not observed | Not observed |

The meaning of the abbreviation or the name of each component in Tables 1 and 2 is shown below.
<Compound that Includes Two or More Polymerizable Unsaturated Groups>
AMA: allyl methacrylate
EDMA: ethylene glycol dimethacrylate
DVB: divinylbenzene
<Fluorine Atom-Containing Monomer>
VDF: vinylidene fluoride
HFP: hexafluoropropylene
TFE: tetrafluoroethylene
<Unsaturated Carboxylic Acid>
MAA: methacrylic acid
IA: itaconic acid
AA: acrylic acid
<Unsaturated Carboxylic Ester>
MMA: methyl methacrylate
EHA: 2-ethylhexyl acrylate
BMA: n-butyl methacrylate
CHMA: cyclohexyl methacrylate
<Aromatic Vinyl Compound>
ST: styrene
EVB: ethylvinylbenzene
<Conjugated Diene Compound>
BD: 1,3-butadiene
<Nitrile Compound>
AN: acrylonitrile In Tables 1 and 2, the symbol "—" indicates that the corresponding component was not used.

3.3. Example 1
3.3.1. Preparation of Protective Film-Forming Composition

The aqueous dispersion S1 and the aqueous dispersion L1 that were mixed so that the amount of the polymer particles (A1) was 10 parts by mass based on 100 parts by mass of the polymer particles (A2), 1 part by mass of a thickener ("CMC1120" manufactured by Daicel Corporation), and 275 parts by mass of water were mixed and dispersed using a mixer ("T.K. Filmix (registered trademark) Model 56-50" manufactured by PRIMIX Corporation) to prepare a protective film-forming composition.

The protective film-forming composition was subjected to toluene insoluble content measurement, DSC measurement (glass transition temperature (Tg) and melting temperature (Tm)), and TG measurement (weight loss start temperature $T_{10}$) in the same manner as described above (see "3.2.1. Synthesis Example 15"). The toluene insoluble content thus measured was 99%, the glass transition temperature (Tg) was −4° C., the melting temperature (Tm) was not observed, and the weight loss start temperature $T_{10}$ was 360° C.

3.3.2. Production of Positive Electrode
<Preparation of Positive Electrode Active Material>

Commercially available lithium iron phosphate (LiFePO$_4$) was ground using an agate mortar, and classified using a sieve to prepare active material particles having a particle size (D50) of 0.5 micrometers.

<Preparation of Positive Electrode Slurry>

A twin-screw planetary mixer ("TK HIVIS MIX 2P-03" manufactured by PRIMIX Corporation) was charged with 4 parts by mass (on a solid basis) of polyvinylidene fluoride (PVDF), 100 parts by mass of the active material particles, 5 parts by mass of acetylene black, and 68 parts by mass of N-methylpyrrolidone (NMP), and the mixture was stirred at 60 rpm for 1 hour. After the addition of 32 parts by mass of NMP, the mixture was stirred for 1 hour to obtain a paste. The paste was stirred at 200 rpm for 2 minutes, stirred at 1800 rpm for 5 minutes, and stirred at 1800 rpm for 1.5 minutes under vacuum (about $5.0 \times 10^3$ Pa) using a stirrer/deaerator ("THINKY Mixer (Awatori Rentarou)" manufactured by THINKY Corporation) to prepare a positive electrode slurry.

<Production of Positive Electrode>

The positive electrode slurry was uniformly applied to the surface of an aluminum foil collector using a doctor blade method so that the resulting film had a thickness of 100 micrometers after drying. The film was dried at 120° C. for 20 minutes. The resulting film was pressed using a roll press so that the film (active material layer) had a density of 2.0 g/cm$^3$ to obtain a positive electrode in which a positive electrode active material layer was formed on the surface of the collector.

3.3.3. Formation of Protective Film (Production of Positive Electrode Provided with Protective Film)

The protective film-forming composition obtained as described above was uniformly applied to the surface of the positive electrode active material layer using a die coating method, and dried at 120° C. for 5 minutes to form a protective film on the surface of the positive electrode active material layer. Note that the thickness of the protective film was 3 micrometers.

3.3.4. Production of Negative Electrode
<Preparation of Negative Electrode Slurry>

A twin-screw planetary mixer ("TK HIVIS MIX 2P-03" manufactured by PRIMIX Corporation) was charged with 4 parts by mass (on a solid basis) of polyvinylidene fluoride (PVDF), 100 parts by mass (on a solid basis) of graphite (negative electrode active material), and 80 parts by mass of N-methylpyrrolidone (NMP). The mixture was stirred at 60 rpm for 1 hour. After the addition of 20 parts by mass of NMP, the mixture was stirred at 200 rpm for 2 minutes, stirred at 1800 rpm for 5 minutes, and stirred at 1800 rpm for 1.5 minutes under vacuum using a stirrer/deaerator ("THINKY Mixer (Awatori Rentarou)" manufactured by THINKY Corporation) to prepare a negative electrode slurry.

<Production of Negative Electrode>

The negative electrode slurry was uniformly applied to the surface of a copper foil collector using a doctor blade method so that the resulting film had a thickness of 150 micrometers after drying. The film was dried at 120° C. for 20 minutes. The film was pressed using a roll press so that the film had a density of 1.5 g/cm³ to obtain a negative electrode in which a negative electrode active material layer was formed on the surface of the collector.

3.3.5. Assembly of Lithium-Ion Battery Cell

In a gloved box in which the internal atmosphere was replaced with Ar so that the dew point was −80° C., a negative electrode (diameter: 16.16 mm) prepared by punching the negative electrode produced as described above was placed on a two-electrode coin cell ("HS Flat Cell" manufactured by Hohsen Corp.). A separator ("Celgard #2400" manufactured by Celgard, LLC.) (diameter: 24 mm) prepared by punching a polypropylene porous membrane was placed on the negative electrode, and 500 microliters of an electrolyte solution was injected into the two-electrode coin cell while avoiding entrance of air. A positive electrode (diameter: 15.95 mm) prepared by punching the positive electrode provided with the protective film that was produced as described above was placed so that the separator and the protective film formed on the positive electrode faced each other, and the outer casing of the two-electrode coin cell was air-tightly secured using a screw to assemble a lithium-ion battery cell (electrical storage device). Note that the electrolyte solution was prepared by dissolving $LiPF_6$ in ethylene carbonate/ethyl methyl carbonate (mass ratio=1/1) at a concentration of 1 mol/L.

3.3.6. Measurement of Residual Capacity Ratio and Resistance Increase Ratio

The battery cell produced as described above was placed in a thermostat bath (25° C.), charged at a constant current (0.1 C), charged at a constant voltage (4.1 V) when the voltage reached 4.1 V, and determined to be fully charged (cut-off) when the current value reached 0.01 C. The battery cell was then discharged at a constant current (0.2 C), and determined to be fully discharged (cut-off) when the voltage reached 2.5 V (aging charge-discharge).

The battery cell was then placed in a thermostat bath (25° C.), charged at a constant current (0.2 C), charged at a constant voltage (4.1 V) when the voltage reached 4.1 V, and determined to be fully charged (cut-off) when the current value reached 0.01 C. The battery cell was then discharged at a constant current (0.2 C), and determined to be fully discharged (cut-off) when the voltage reached 2.5 V, and the discharge capacity (initial value) (C1) at 0.2 C was measured.

The battery cell was then placed in a thermostat bath (25° C.), charged at a constant current (0.2 C), charged at a constant voltage (4.1 V) when the voltage reached 4.1 V, and determined to be fully charged (cut-off) when the current value reached 0.01 C.

The charged cell was subjected to electrochemical impedance spectroscopy (EIS) to measure the initial resistance value EISa.

The battery cell was then placed in a thermostat bath (60° C.), charged at a constant current (0.2 C), and charged at a constant voltage (4.4 V) when the voltage reached 4.4 V (168 hours) (accelerated overcharge test).

The charged cell was placed in a thermostat bath (25° C.) so that the temperature of the cell decreased to 25° C., discharged at a constant current (0.2 C), and determined to be fully discharged (cut-off) when the voltage reached 2.5 V, and the discharge capacity (after test) (C2) at 0.2 C was measured.

The battery cell was then placed in a thermostat bath (25° C.), charged at a constant current (0.2 C), charged at a constant voltage (4.1 V) when the voltage reached 4.1 V, and determined to be fully charged (cut-off) when the current value reached 0.01 C. The battery cell was then discharged at a constant current (0.2 C), and determined to be fully discharged (cut-off) when the voltage reached 2.5 V. The cell was subjected to EIS to measure a resistance value EISb after applying thermal stress and overcharge stress.

The residual capacity ratio calculated by substituting the measured values in the following expression (6) was 93%, and the resistance increase ratio calculated by substituting the measured values in the following expression (7) was 150%.

Residual capacity ratio (%)=(C2/C1)×100     (6)

Resistance increase ratio (%)=(EISb/EISa)×100     (7)

The durability was evaluated to be good when the residual capacity ratio was 75% or more, and the resistance increase ratio was 300% or less.

Note that "1 C" refers to a current value that requires 1 hour to fully discharge a cell having a specific electrical capacitance. For example, "0.1 C" refers to a current value that requires 10 hours to fully discharge the cell, and "10 C" refers to a current value that requires 0.1 hours to fully discharge the cell.

3.4. Examples 2 to 10 and Comparative Examples 1 to 9

Protective film-forming compositions shown in Tables 3 and 4 were prepared in the same manner as in Example 1, except that the aqueous dispersion shown in Table 3 or 4 was used in the amount shown in Table 3 or 4. The resulting protective film-forming compositions were subjected to toluene insoluble content measurement, DSC measurement (glass transition temperature (Tg) and melting temperature (Tm)), and TG measurement (weight loss start temperature $T_{10}$) in the same manner as described above (see "3.2.1. Synthesis Example 15"). The results are shown in Tables 3 and 4. An electrical storage device was produced using each protective film-forming composition prepared as described above, and evaluated in the same manner as in Example 1. The evaluation results are shown in Tables 3 and 4.

TABLE 3

|  |  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Polymer particles (A) | Polymer particles (A1) | Type of aqueous dispersion | S1 | S2 | S3 | S4 | S5 | S6 | S7 | S8 | S13 | S14 |
|  |  | Amount (parts by mass) | 10 | 10 | 10 | 10 | 1 | 14 | 10 | 10 | 10 | 10 |
|  | Polymer particles (A2) | Type of aqueous dispersion | L1 | L2 | L3 | L4 | L5 | L4 | L4 | L12 | L6 | L1 |
|  |  | Amount (parts by mass) | 100 | 100 | 100 | 100 | 100 | 100 | 100 | 100 | 100 | 100 |

TABLE 3-continued

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
|  | Particle size ratio (Da2/Da1) | 1.2 | 4.0 | 2.1 | 13.5 | 1.2 | 6.8 | 28.4 | 5.0 | 1.9 | 2.1 |
|  | Toluene insoluble content (%) | 99 | 93 | 100 | 99 | 99 | 99 | 98 | 99 | 99 | 99 |
| TG | $T_{10}$ (° C.) | 360 | 340 | 400 | 365 | 378 | 345 | 371 | 350 | 391 | 365 |
| DSC | Tg (° C.) | −4 | 5 | −15 | −8 | −4 | −12 | 3 | −32 | −11 | 3 |
|  | Tm (° C.) | Not observed | Not observed | Not observed | Not observed | Not observed | Not observed | Not observed | Not observed | Not observed | Not observed |
| Electrical storage device | Residual capacity ratio (%) | 93 | 89 | 95 | 92 | 90 | 88 | 85 | 90 | 79 | 77 |
|  | Resistance increase ratio (%) | 150 | 170 | 180 | 150 | 180 | 210 | 140 | 220 | 270 | 280 |

TABLE 4

|  |  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Polymer particles (A) | Polymer particles (A1) | Type of aqueous dispersion | S9 | S10 | S10 | S11 | S12 | S1 | — | S7/S9 | — |
|  |  | Amount (parts by mass) | 0.05 | 10 | 10 | 20 | 20 | 100 | — | 10/100 | — |
|  | Polymer particles (A2) | Type of aqueous dispersion | L7 | L8 | L9 | L10 | L11 | — | L1 | — | L1/L4 |
|  |  | Amount (parts by mass) | 100 | 100 | 100 | 100 | 100 | — | 100 | — | 10/100 |
|  | Particle size ratio (Da2/Da1) |  | 1.8 | 1.9 | 0.5 | 35.0 | 12.0 | — | — | — | — |
|  | Toluene insoluble content (%) |  | 99 | 91 | 89 | 85 | 94 | 85 | 99 | 93 | 99 |
| TG | $T_{10}$ (° C.) |  | 354 | 299 | 325 | 326 | 373 | 338 | 360 | 340 | 379 |
| DSC | Tg (° C.) |  | Not observed | −5 | −5 | −7 | −14 | −5 | Not observed | −3 | Not observed |
|  | Tm (° C.) |  | Not observed | Not observed | Not observed | Not observed | Not observed | Not observed | Not observed | Not observed | Not observed |
| Electrical storage device | Residual capacity ratio (%) |  | 44 | 56 | 40 | 40 | 38 | Could not be evaluated | Could not be evaluated | 24 | Could not be evaluated |
|  | Resistance increase ratio (%) |  | 600 | 450 | 500 | 250 | 400 | Could not be evaluated | Could not be evaluated | 720 | Could not be evaluated |

In Tables 3 and 4, the symbol "−" indicates that the corresponding component was not used. In Comparative Example 8, 10 parts by mass of the polymer particles (A1) included in the aqueous dispersion S7 and 100 parts by mass of the polymer particles (A1) included in the aqueous dispersion S9 were used in a mixed state (see "S7/S9" ("Type of aqueous dispersion") and "10/100" ("Amount") in Table 4). The expressions in Table 4 corresponding to Comparative Example 9 have a similar meaning.

3.5. Example 11

3.5.1. Production of Positive Electrode and Negative Electrode

A positive electrode and a negative electrode were produced in the same manner as in Example 1.

3.5.2. Formation of Protective Film (Production of Separator Provided with Protective Film)

The protective film-forming composition obtained as described above (see "3.3.1. Preparation of protective film-forming composition") was applied to each side of a separator ("Celgard #2400" manufactured by Celgard, LLC.) (polypropylene porous membrane) using a dip coating method, and dried at 80° C. for 10 minutes to form a protective film on each side of the separator. Note that the thickness of each protective film was 2 micrometers (4 micrometers in total).

3.5.3. Assembly of Lithium-Ion Battery Cell

In a gloved box in which the internal atmosphere was replaced with Ar so that the dew point was −80° C., a negative electrode (diameter: 16.16 mm) prepared by punching the negative electrode produced as described above was placed on a two-electrode coin cell ("HS Flat Cell" manufactured by Hohsen Corp.). A separator (diameter: 24 mm) prepared by punching the separator provided with the protective film that was obtained as described above (see "3.5.2. Formation of protective film (production of separator provided with protective film)") was placed on the negative electrode, and 500 microliters of an electrolyte solution was injected into the two-electrode coin cell while avoiding entrance of air. A positive electrode (diameter: 15.95 mm) prepared by punching the positive electrode produced as described above was placed on the separator, and the outer casing of the two-electrode coin cell was air-tightly secured using a screw to assemble a lithium-ion battery cell (electrical storage device). Note that the electrolyte solution was prepared by dissolving $LiPF_6$ in ethylene carbonate/ethyl methyl carbonate (mass ratio=1/1) at a concentration of 1 mol/L.

3.5.4. Measurement of Residual Capacity Ratio and Resistance Increase Ratio

The residual capacity ratio and the resistance increase ratio were measured in the same manner as in Example 1.

3.5.5. Adhesion Between Protective Film and Electrode

A specimen (width: 2 cm, length: 5 cm) was cut from the negative electrode, the separator (provided with the protective film), and the positive electrode produced as described above. The specimens were stacked (negative electrode/separator (provided with protective film)/positive electrode) so that the negative electrode active material layer and the positive electrode active material layer faced the separator (provided with the protective film). The resulting laminate was impregnated with a solvent (ethylene carbonate/ethyl methyl carbonate (mass ratio=1/1)), placed between polyester films ("Lumirror S10" manufactured by Toray Industries, Inc., thickness: 250 micrometers), and heated and pressed at 80° C. for 5 minutes under 0.1 MPa. The negative electrode and the positive electrode were removed from the separator (provided with the protective film) before the solvent was evaporated, and evaluated in accordance with the following standard.

Very good: Both the negative electrode and the positive electrode were removed with resistance, and part or the entirety of the active material layer was bonded and transferred to the protective film.

Good: Both the negative electrode and the positive electrode were removed with resistance, but the active material layer was not transferred to the protective film.

Poor: The negative electrode or the positive electrode was removed with no resistance (i.e., the negative electrode or the positive electrode had been removed).

3.6. Examples 12 to 21 and Comparative Examples 10 to 15

Protective film-forming compositions shown in Table 5 were prepared in the same manner as in Example 1, except that the aqueous dispersion shown in Table 5 was used in the amount shown in Table 5. The resulting protective film-forming compositions were subjected to toluene insoluble content measurement, DSC measurement (glass transition temperature (Tg) and melting temperature (Tm)), and TG measurement (weight loss start temperature $T_{10}$) in the same manner as described above (see "3.2.1. Synthesis Example 15"). The results are shown in Table 5. An electrical storage device was produced using each protective film-forming composition prepared as described above, and evaluated in the same manner as in Example 11. The evaluation results are shown in Table 5.

TABLE 5

| | | | Example 11 | Example 12 | Example 13 | Example 14 | Example 15 | Example 16 | Example 17 | Example 18 | Example 19 |
|---|---|---|---|---|---|---|---|---|---|---|---|
| Polymer particles (A) | Polymer particles (A1) | Type of aqueous dispersion | S1 | S2 | S3 | S8 | S8 | S8 | S8 | S1 | S13 |
| | | Amount (parts by mass) | 10 | 10 | 10 | 10 | 100 | 1800 | 900 | 50 | 10 |
| | Polymer particles (A2) | Type of aqueous dispersion | L1 | L2 | L3 | L12 | L13 | L13 | L14 | L15 | L6 |
| | | Amount (parts by mass) | 100 | 100 | 100 | 100 | 100 | 100 | 100 | 100 | 100 |
| | Particle size ratio (Da2/Da1) | | 1.2 | 4.0 | 2.1 | 5.0 | 4.1 | 4.1 | 2.5 | 1.3 | 1.9 |
| | Toluene insoluble content (%) | | 99 | 93 | 100 | 99 | 97 | 97 | 97 | 93 | 99 |
| TG | $T_{10}$ (° C.) | | 360 | 340 | 400 | 350 | 352 | 348 | 352 | 364 | 391 |
| DSC | Tg (° C.) | | −4 | 5 | −15 | −32 | −34 | −35 | −35 | −3 | −11 |
| | Tm (° C.) | | Not observed | Not observed | Not observed | Not observed | Not observed | Not observed | Not observed | Not observed | Not observed |
| Electrical storage device | Adhesion between protective film and electrode | | Good | Very good | Good | Good | Very good | Very good | Very good | Very good | Good |
| | Residual capacity ratio (%) | | 92 | 89 | 96 | 92 | 92 | 90 | 89 | 93 | 85 |
| | Resistance increase ratio (%) | | 160 | 160 | 170 | 200 | 170 | 140 | 130 | 160 | 280 |

| | | | Example 20 | Example 21 | Comparative Example 10 | Comparative Example 11 | Comparative Example 12 | Comparative Example 13 | Comparative Example 14 | Comparative Example 15 |
|---|---|---|---|---|---|---|---|---|---|---|
| Polymer particles (A) | Polymer particles (A1) | Type of aqueous dispersion | S14 | S15 | S9 | S10 | S10 | S1 | — | S10 |
| | | Amount (parts by mass) | 10 | 200 | 0.05 | 10 | 10 | 100 | — | 10 |
| | Polymer particles (A2) | Type of aqueous dispersion | L1 | L15 | L7 | L8 | L9 | — | L1 | L16 |
| | | Amount (parts by mass) | 100 | 100 | 100 | 100 | 100 | — | 100 | 100 |
| | Particle size ratio (Da2/Da1) | | 2.1 | 1.7 | 1.8 | 1.9 | 0.5 | — | — | 5.0 |
| | Toluene insoluble content (%) | | 99 | 93 | 99 | 91 | 89 | 85 | 99 | 97 |

TABLE 5-continued

|  |  |  | | | | | | | | |
|---|---|---|---|---|---|---|---|---|---|---|
| | TG | $T_{10}$ (° C.) | 365 | 355 | 354 | 299 | 325 | 338 | 360 | 299 |
| | DSC | Tg (° C.) | 3 | 56 | Not observed | −5 | −5 | −5 | Not observed | −5 |
| | | Tm (° C.) | Not observed | Not observed | Not observed | Not observed | Not observed | Not observed | Not observed | Not observed |
| Electrical storage device | Adhesion between protective film and electrode | | Good | Very good | Poor | Good | Good | Good | Poor | Good |
| | Residual capacity ratio (%) | | 80 | 90 | Could not be evaluated | 41 | 38 | Could not be evaluated | Could not be evaluated | 44 |
| | Resistance increase ratio (%) | | 240 | 170 | Could not be evaluated | 560 | 600 | Could not be evaluated | Could not be evaluated | 500 |

As is clear from the results shown in Tables 3 and 4, the electrical storage devices (lithium-ion batteries) of Example 1 to 10 including the positive electrode provided with the protective film according to the invention exhibited high residual capacity after the durability test, and an excellent capability to suppress an increase in resistance. In Comparative Examples 1 to 5 and 8, an electrical storage device that exhibits both high residual capacity and an excellent capability to suppress an increase in resistance could not be obtained. Since the electrical storage device of Comparative Example 6 did not function as a battery, the residual capacity ratio and the resistance increase ratio could not be evaluated. It is considered that the electrical storage device of Comparative Example 6 did not function as a battery since the positive electrode and the negative electrode were completely isolated by the protective film that was formed using only the polymer particles (A1) having a binder function. In Comparative Examples 7 and 9, since the protective film had a poor binding capability, the protective film was removed when producing a battery, and a battery including the protective film could not be produced.

As is clear from the results shown in Table 5, the electrical storage devices (lithium-ion batteries) of Example 11 to 20 including the separator provided with the protective film according to the invention exhibited high residual capacity after the durability test, and an excellent capability to suppress an increase in resistance, and adhesion between the protective film and the electrode was good. In Comparative Examples 11, 12, and 15, an electrical storage device that exhibits both high residual capacity and an excellent capability to suppress an increase in resistance could not be obtained. Since the electrical storage device of Comparative Example 13 did not function as a battery, the residual capacity ratio and the resistance increase ratio could not be evaluated. It is considered that the electrical storage device of Comparative Example 13 did not function as a battery since the positive electrode and the negative electrode were completely isolated by the protective film that was formed using only the polymer particles (A1) having a binder function. In Comparative Examples 10 and 14, since the protective film had a poor binding capability, the protective film was removed when producing a battery, and a battery including the protective film could not be produced.

The invention is not limited to the above embodiments. Various modifications and variations may be made of the above embodiments. The invention includes various other configurations substantially the same as the configurations described in connection with the above embodiments (such as a configuration having the same function, method, and results, or a configuration having the same objective and results). The invention also includes configurations in which an unsubstantial part described in connection with the above embodiments is replaced with another part. The invention also includes a configuration having the same effects as those of the configurations described in connection with the above embodiments, or a configuration capable of achieving the same objective as that of the configurations described in connection with the above embodiments. The invention also includes a configuration in which a known technique is added to the configurations described in connection with the above embodiments.

REFERENCE SIGNS LIST 1, 2, 3: electrical storage device, 10, 110, 210: positive electrode, 12, 112, 212: positive electrode current collector, 14, 114, 214: positive electrode active material layer, 20, 120, 220: negative electrode, 22, 122, 222: negative electrode current collector, 24, 124, 224: negative electrode active material layer, 30, 130, 230: protective film, 40, 140, 240: electrolyte solution, 150, 250: separator

The invention claimed is:

1. A composition comprising:
polymer particles (A1), polymer particles (A2), and a liquid medium,
wherein:
the polymer particles (A1) comprise a repeating unit derived from a compound comprising two or more polymerizable unsaturated groups in an amount of less than 15 parts by mass based on 100 parts by mass of the polymer particles (A1),
the polymer particles (A2) comprise a repeating unit derived from a compound comprising two or more polymerizable unsaturated groups in an amount of 20 to 100 parts by mass based on 100 parts by mass of the polymer particles (A2), and
the polymer particles (A2) have a toluene insoluble content of 90% or more, and have a 10% weight loss temperature of 320° C. or more when heated at a rate of 20° C./min during thermogravimetry in an air atmosphere.

2. The composition according to claim 1, wherein the compound comprising two or more polymerizable unsaturated groups is at least one compound selected from the group consisting of a polyfunctional (meth)acrylate and an aromatic polyfunctional vinyl compound.

3. The composition according to claim 1, wherein the polymer particles (A2) further comprise a repeating unit derived from an unsaturated carboxylic ester, excluding a compound that falls under the compound that comprises two or more polymerizable unsaturated groups, and a repeating unit derived from an aromatic vinyl compound, excluding a compound that falls under the compound that comprises two or more polymerizable unsaturated groups.

4. The composition according to claim 1, wherein the polymer particles (A2) are particles having a void.

5. The composition according to claim 1, wherein the polymer particles (A1) comprise a repeating unit derived from a fluorine atom-containing monomer, and a repeating unit derived from an unsaturated carboxylic acid.

6. The composition according to claim 1, wherein the polymer particles (A1) are polymer alloy particles that comprise (i) a polymer that comprises a repeating unit derived from at least one compound selected from the group consisting of vinylidene fluoride, tetrafluoroethylene, and hexafluoropropylene, and (ii) a polymer that comprises a repeating unit derived from an unsaturated carboxylic acid.

7. The composition according to claim 6, wherein the polymer alloy particles have only one endothermic peak within a temperature range of −50 to +250° C. when subjected to differential scanning calorimetry (DSC) in accordance with JIS K 7121.

8. The composition according to claim 7, wherein the polymer alloy particles have the only one endothermic peak within a temperature range of −30 to +80° C.

9. The composition according to claim 1, wherein the polymer particles (A1) comprise a repeating unit derived from an unsaturated carboxylic acid, a repeating unit derived from an unsaturated carboxylic ester, a repeating unit derived from an aromatic vinyl compound, and a repeating unit derived from a conjugated diene compound.

10. The composition according to claim 9, wherein the polymer particles (A1) have only one endothermic peak within a temperature range of −50 to +80° C. when subjected to differential scanning calorimetry (DSC) in accordance with JIS K 7121.

11. The composition according to claim 1, the composition comprising the polymer particles (A1) in an amount of 0.1 to 15 parts by mass based on 100 parts by mass of the polymer particles (A2).

12. A protective film formed using the composition according to claim 1.

13. An electrical storage device comprising a positive electrode, a negative electrode, the protective film according to claim 12 that is placed between the positive electrode and the negative electrode, and an electrolyte solution.

14. The electrical storage device according to claim 13, further comprising a separator that is placed between the positive electrode and the negative electrode.

15. The electrical storage device according to claim 14, wherein a surface of the separator is covered with the protective film.

16. The electrical storage device according to claim 14, wherein the protective film is contiguously held between the positive electrode or the negative electrode, and the separator.

* * * * *